(12) United States Patent
Huang et al.

(10) Patent No.: US 12,001,816 B2
(45) Date of Patent: Jun. 4, 2024

(54) METHOD AND APPARATUS FOR PERFORMING VISUAL PROGRAMMING

(71) Applicant: Tencent Technology (Shenzhen) Company Limited, Guangdong (CN)

(72) Inventors: Zili Huang, Shenzhen (CN); Boran Pang, Shenzhen (CN); Chenglong Hu, Shenzhen (CN); Zishun Chen, Shenzhen (CN); Huafeng Ma, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 222 days.

(21) Appl. No.: 17/240,683

(22) Filed: Apr. 26, 2021

(65) Prior Publication Data
US 2021/0247968 A1 Aug. 12, 2021

Related U.S. Application Data

(63) Continuation of application No. PCT/CN2020/078657, filed on Mar. 10, 2020.

(30) Foreign Application Priority Data

Apr. 5, 2019 (CN) .......................... 201910273506.2

(51) Int. Cl.
*G06F 8/33* (2018.01)
*G06F 8/34* (2018.01)
*G06F 8/65* (2018.01)

(52) U.S. Cl.
CPC ...................... *G06F 8/34* (2013.01)

(58) Field of Classification Search
CPC ..... G06F 8/34; G06F 8/33; G06F 8/65; G06F 8/64
See application file for complete search history.

(56) References Cited

U.S. PATENT DOCUMENTS 10,276,061 B2 * 4/2019 Chong ................... G09B 19/06
10,761,813 B1 * 9/2020 Echeverria ............... G06F 8/34
(Continued)

FOREIGN PATENT DOCUMENTS

CN 101826018 9/2010
CN 103197929 7/2013
(Continued)

OTHER PUBLICATIONS

"Playing with Colored Blocks is a Fun Way for Kids to Learn Programming", Nov. 20, 2018 (Year: 2018).*
(Continued)

*Primary Examiner* — Hang Pan
*Assistant Examiner* — Noor Alkhateeb
(74) *Attorney, Agent, or Firm* — ARENTFOX SCHIFF LLP

(57) ABSTRACT

In a method for performing visual programming, applicable to a terminal, a target role in a visual layout region of a target interface is determined. An event building block set is displayed in an event building block triggering region of the target interface. In response to detecting a selection operation on a first event building block in the event building block set, the first event building block corresponding to the target role is added to a visual programming region of the target interface. In response to detecting a selection operation on a first function building block in at least one function building block corresponding to the first event building block displayed in a function building block triggering region of the target interface, the first function building block corresponding to the target role is added to the visual programming region.

16 Claims, 8 Drawing Sheets

(56) References Cited

U.S. PATENT DOCUMENTS

| | | | | |
|---|---|---|---|---|
| 10,853,100 | B1* | 12/2020 | Kathpalia | G06F 9/451 |
| 2014/0354650 | A1* | 12/2014 | Singh | G06F 8/10 |
| | | | | 345/440 |
| 2016/0026439 | A1* | 1/2016 | Zaydman | G06F 8/33 |
| | | | | 717/113 |
| 2017/0046133 | A1* | 2/2017 | Hoshikawa | G06F 8/31 |
| 2017/0052767 | A1* | 2/2017 | Bennett | G06F 8/34 |
| 2017/0063611 | A1* | 3/2017 | Sheba | H04W 4/70 |
| 2018/0081639 | A1 | 3/2018 | Collins | |
| 2019/0034175 | A1 | 1/2019 | Ogami et al. | |

FOREIGN PATENT DOCUMENTS

| | | |
|---|---|---|
| CN | 105511860 | 4/2016 |
| CN | 105808226 | 7/2016 |
| CN | 106362403 | 2/2017 |
| CN | 107667474 | 2/2018 |
| CN | 106021363 | 5/2018 |
| CN | 109240675 | 1/2019 |
| CN | 109992263 | 7/2019 |

OTHER PUBLICATIONS

International Search Report dated Jun. 16, 2020 in PCT Application No. PCT/CN2020/078657, filed Mar. 10, 2020 (with English Translation).
Written Opinion dated Jun. 16, 2020 in PCT Application No. PCT/CN2020/078657, filed Mar. 10, 2020.
Office Action dated Apr. 25, 2021 in corresponding Chinese patent application No. 201910273506.2.

* cited by examiner

Classification of function building blocks

○ Logic type  ○ Basic building block type  ○ Fillable type

○ Minimum building block unit type  ○ Advanced function building block type

METHOD AND APPARATUS FOR PERFORMING VISUAL PROGRAMMING

RELATED APPLICATIONS

This application claims priority to International Application No. PCT/CN2020/078657, filed on Mar. 10, 2020, which claims priority to Chinese Patent Application No. 201910273506.2, entitled "METHOD AND APPARATUS FOR PERFORMING VISUAL PROGRAMMING" and filed on Apr. 5, 2019. The entire disclosures of the prior applications are hereby incorporated by reference in their entirety.

FIELD OF THE TECHNOLOGY

Embodiments of this disclosure relate to the field of computer technologies, including a method and apparatus for performing visual programming.

BACKGROUND OF THE DISCLOSURE

Visual programming tools have the features of having low complexity and being convenient in use. The core of visual programming is to convert a textual programming language in a code form into a graphical programming language which is easy to understand, allowing a user to understand the meanings of functions expressed by the textual programming language by reading a series of graphical content. Currently, when a visual programming solution is used, a user may first select a building block that the user needs from a building block list field on the right side of a programming interface, then place the building block in a programming operation region. If the user needs to use another building block, the user may further add the other building block to the programming operation region.

A building block toolbox is specially designed on a right column of the current building block list field, to allow the user to set necessary functions for a role. For example, the building block toolbox may include designing functions such as making a skin design or motion design for the role.

In current visual programming tools, the setting of building blocks is mixed up with that of the building block toolbox. In a case that the user does not place any building block in the programming operation region, if the user pulls the building block toolbox out alone, the building block toolbox cannot be compiled, leading to a function setting failure.

SUMMARY

Embodiments of this application provide a method and apparatus for performing visual programming, to improve a setting success rate of function building blocks.

According to an exemplary aspect, in a method for performing visual programming, applicable to a terminal, a target role in a visual layout region of a target interface is determined with the circuitry of the terminal. An event building block set is displayed by the circuitry of the terminal in an event building block triggering region of the target interface. In response to detecting a selection operation on a first event building block in the event building block set, the first event building block corresponding to the target role is added by the circuitry of the terminal to a visual programming region of the target interface. In response to detecting a selection operation on a first function building block in at least one function building block corresponding to the first event building block displayed in a function building block triggering region of the target interface, the first function building block corresponding to the target role is added by the circuitry of the terminal to the visual programming region.

According to an exemplary aspect, an apparatus for performing visual programming, includes processing circuitry configured to determine a target role in a visual layout region of a target interface, and cause a display to display an event building block set in an event building block triggering region of the target interface. The processing circuitry also adds, in response to detecting a selection operation on a first event building block in the event building block set, the first event building block corresponding to the target role to a visual programming region of the target interface. The processing circuitry adds, in response to detecting a selection operation on a first function building block in at least one function building block corresponding to the first event building block displayed in a function building block triggering region of the target interface, the first function building block corresponding to the target role to the visual programming region.

According to an exemplary aspect, an apparatus for performing visual programming includes processing circuitry configured to cause a display to display a target interface. The processing circuitry adds, in response to detecting a selection operation on a first event building block in an event building block set of the target interface, the first event building block corresponding to a target role to a visual programming region of the target interface. The event building block set is displayed in an event building block triggering region of the target interface, and the target role is displayed in a visual layout region of the target interface. The processing circuitry adds, in response to detecting a selection operation on a first function building block in at least one function building block corresponding to the first event building block displayed in a function building block triggering region of the target interface, the first function building block corresponding to the target role to the visual programming region of the target interface

BRIEF DESCRIPTION OF THE DRAWINGS

To describe the technical solutions in the embodiments of this application more clearly, the following briefly introduces the accompanying drawings required for describing the embodiments. As can be appreciated, the accompanying drawings in the following description show merely some exemplary embodiments of this application, and a person skilled in the art will recognize that these accompanying drawings are not limiting upon the present disclosure.

DESCRIPTION OF EMBODIMENTS

Embodiments of this disclosure provide a method and apparatus for performing visual programming, to improve a setting success rate of function building blocks, and avoid a failure in building block function settings.

To make the objectives, features, and advantages of the embodiments of this disclosure clearer and more comprehensible, the following clearly describes the technical solutions in the embodiments of this disclosure with reference to the accompanying drawings in the embodiments of this disclosure. As can be appreciated, the embodiments described are merely exemplary, and other embodiments are possible without departing from the scope of this disclosure as one of ordinary skill would recognize.

In the specification, claims, and accompanying drawings of the embodiments of this application, the terms "include", "contain", and any other variants are intended to cover a non-exclusive inclusion. Therefore, a process, method, system, product, or device that includes a series of units is not necessarily limited to those units, but may include other units not specified expressly, or inherent to such units of the process, method, product, or device.

It may be understood that the terms "first", "second", and the like used in this application may be used for describing various concepts in this specification. However, the concepts are not limited by the terms unless otherwise specified. The terms are merely used for distinguishing one concept from another concept. For example, without departing from the scope of this application, a first event building block may be referred to as a second event building block, and similarly, the second event building block may be referred to as the first event building block.

The term "at least one" used in this application means including one or more, and a quantity corresponding to "at least one" is an integer. For example, the "at least one" may be 1, 2 or 3. The term "plurality of" used in this application means including two or more, and a quantity corresponding to "plurality of" in an integer. For example, the "plurality of" may be 2, 3, or 4. The term "each" used in this application means each one of a plurality of corresponding ones. For example, a plurality of event building blocks are three event building blocks, then each of the plurality of event building blocks refers to each event building block of the three event building blocks. The term "any" used in this application means any one of a plurality of corresponding ones. For example, a plurality of event building blocks are three event building blocks, then any of the plurality of event building blocks refers to any one of the three event building blocks, which may be the first one, the second one, or the third one.

Figure 1:
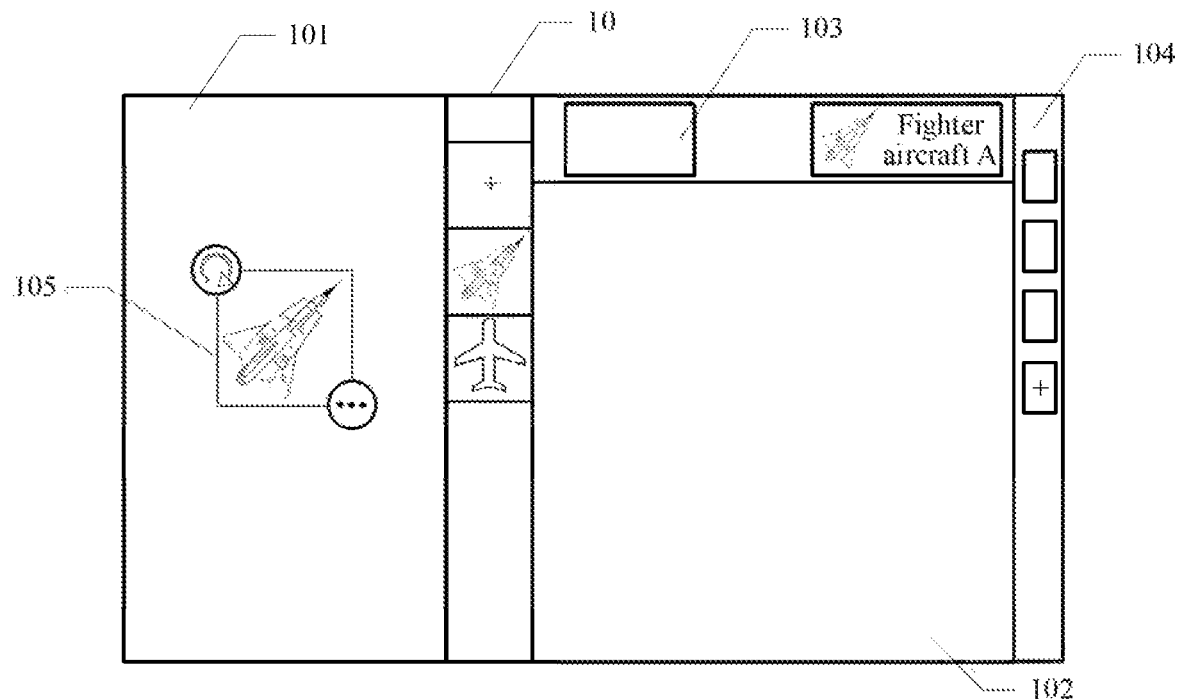
FIG. 1 is a schematic diagram of interface display of a target interface according to an exemplary embodiment of this disclosure.

The method for performing visual programming provided in the exemplary embodiments of this disclosure may be applied to a visual programming tool. There is a target interface in the visual programming tool. FIG. 1 is a schematic diagram of interface display of a target interface 10 according to an exemplary embodiment of this disclosure. The target interface 10 may include a visual layout region 101, a visual programming region 102, an event building block triggering region 103, and a function building block triggering region 104. Relative positions of the visual layout region 101, the visual programming region 102, the event building block triggering region 103, and the function building block triggering region 104 in the target interface 10 and a size of each of the regions may all be flexibly determined according to actual situations, and this is not limited herein.

The visual layout region 101 is configured to display a target role 105 after the target role 105 is determined. The target role 105 may be determined according to an application scenario. For example, the target role 105 may be a plane or a cartoon character in a game scene. For example, the target role 105 shown in FIG. 1 may be a fighter aircraft.

The visual programming region 102 is an operation region for event building blocks and function building blocks. The event building blocks and the function building blocks may be operated in the visual programming region 102. The event building block is a logic block used for describing performing triggering when which event happens. For example, there may be a plurality of event building blocks, including, but not limited to when a game starts, when a role is clicked, when a screen is clicked, and the like. The event building block may be determined according to an application scenario. At least one event building block may be designed for one target role 105 in the embodiments of this application.

The event building block triggering region 103 is a control region configured to trigger whether to add an event building block. The event building block triggering region 103 may be controlled by a user for whether to add an event building block. The event building block triggering region 103 may be located at any position on the target interface 10. For example, the event building block triggering region 103 may be located above the visual programming region 102, to make it convenient for the user perform a handy operation when an event building block needs to be added. The event building block triggering region 103 may be fixedly stored on the target interface 10, or may be called out and hidden in a plurality of manners. For details, reference may be made to the exemplary descriptions for the event building block triggering region 103 in the subsequent embodiments.

The function building block triggering region 104 is a control region configured to trigger whether to add a function building block. The function building block triggering region 104 may be controlled by the user for whether to add a function building block. The function building block triggering region 104 may be displayed in the visual programming region 102 after an event building block is successfully added, or the function building block may be located at a right side of the visual programming region 102. A position of the function building block may be determined with reference to an application scenario. The function building block triggering region 104 may be fixedly stored on the target interface 10, or may be called out and hidden in a plurality of manners. For details, reference may be made to the exemplary descriptions for the function building block triggering region 104 in the subsequent exemplary embodiments.

In the exemplary embodiments of this disclosure, visual programming refers to a programming manner that can be performed merely by dragging an event building block and a function building block without using code. A building block refers to a rectangular-block shaped structure used for replacing a code segment in visual programming. A corresponding application can be created by stitching building blocks. Optionally, an application created by using the building blocks may be applied to a social tool, or may be a relatively independent application (APP), for example, a small game or an applet run in a social tool. Two types of building blocks are set in the target interface 10, event building blocks and function building blocks. The function building blocks are logic blocks that can perform some functions of the target role 105 in addition to the event building blocks, for example, logic blocks that can perform behaviors such as movement and rotation.

Figure 2:
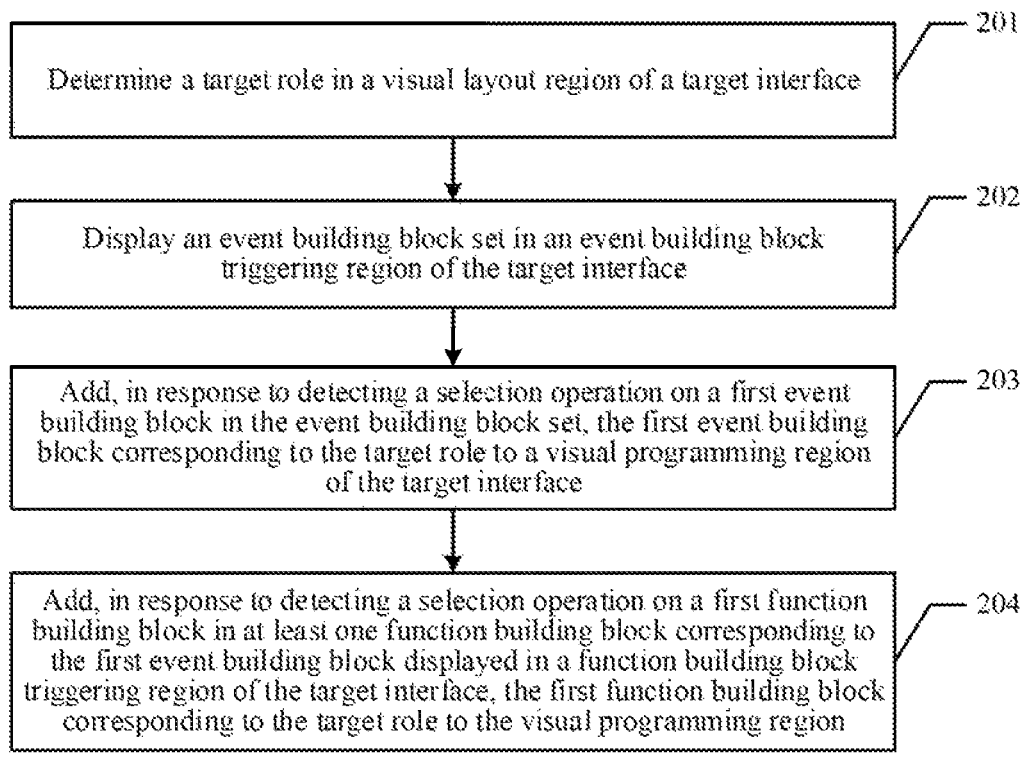
FIG. 2 is a schematic block flowchart of a method for performing visual programming according to an exemplary embodiment of this disclosure.

An exemplary embodiment of the method for performing visual programming in this application may be applied to a visual programming scenario. The method for performing visual programming may be implemented based on the target interface 10 shown in FIG. 1. Referring to FIG. 2, a method for performing visual programming provided by an embodiment of this application may include the following steps.

In step 201, a target role in a visual layout region of a target interface is determined.

In an exemplary embodiment of this disclosure, a visual layout region 101 is set in the target interface 10. The visual layout region 101 is configured to display a target role 105 after the target role 105 is determined. The target role 105 may be determined according to an application scenario. For example, the target role 105 may be a plane or a cartoon character in a game scene.

For example, a user may switch to or add the target role 105 needed by the user in a role list displayed in a column on a right side of the visual layout region 101. For example, the user adds a selected target role 105 to the visual layout region 101 from the role list in a dragging manner, so that the target role 105 can be displayed in the visual layout region 101.

In step 202, an event building block set is displayed in an event building block triggering region of the target interface.

Figure 3:
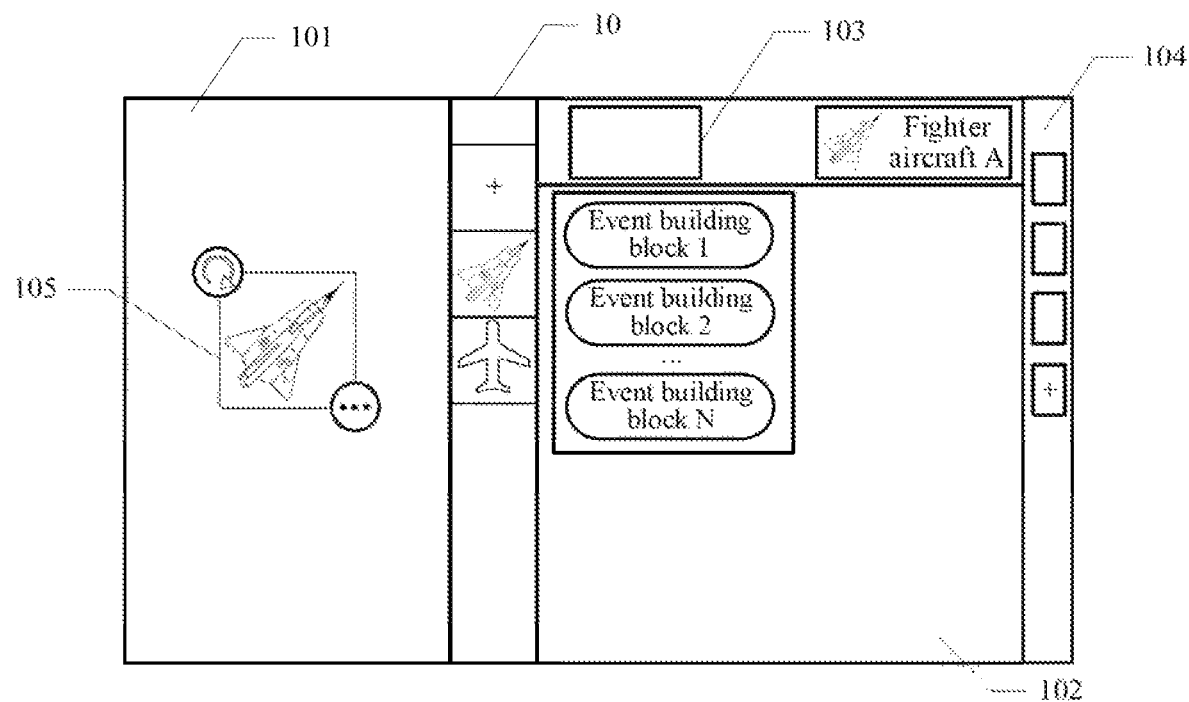
FIG. 3 is a schematic diagram of a target interface of selecting a type of an event building block that needs to be added according to an exemplary embodiment of this disclosure.

In an exemplary embodiment of this disclosure, an event building block triggering region 103 is further displayed in the target interface 10. The event building block triggering region 103 is a control area configured to trigger whether to add an event building block. The event building block triggering region 103 may be controlled by the user for whether to add an event building block. FIG. 3 is a schematic diagram of a target interface of selecting a type of an event building block that needs to be added according to an exemplary embodiment of this disclosure. When the user needs to add an event building block, the user may operate the event building block triggering region 103 on the target interface 10. In this case, an event building block set may be displayed in the event building block triggering region 103.

A manner of displaying the event building block set in the event building block triggering region 103 may include at least displaying the event building block set in the event building block triggering region 103 in a pop-up window manner, displaying the event building block set in the event building block triggering region 103 in a drop-down list manner, and/or displaying the event building block set in the event building block triggering region 103 in a floating layer manner. In addition, the event building block set may be displayed in any region of the event building block triggering region 103. For example, the event building block set is displayed in a fixed region (for example, the fixed region may be located on an upper left corner of the visual programming region 102) of the event building block triggering region 103.

In an exemplary embodiment of this disclosure, after the user selects a related event building block from the event building block set, the corresponding event building block triggering region 103 may be hidden. There may be a plurality of hiding manners for the event building block triggering region 103. For example, the event building block triggering region 103 may return after popping up from the visual programming region 102, or the event building block triggering region 103 may be displayed on the visual programming region 102 in a transparentized manner, or the event building block triggering region 103 may be zoomed out into a prompt on the visual programming region 102. By using the prompt, the user is prompted that the event building block triggering region 103 can be opened again. The implementation may be determined according to an application scenario, and this is not limited herein.

The event building block set may include at least one type of event building blocks in an exemplary embodiment of this disclosure. The event building block set may be an event building block list, or an event building block window, or an event building block tree, and this is not limited herein. For example, as shown in FIG. 3, the event building block set is displayed in the event building block triggering region 103 in a drop-down list manner, and N event building blocks in the event building block set can all be displayed. The user may perform a selection operation on any event building block in the event building block set. It is not limited that, the user may alternatively select two or more event building blocks from the event building block set.

In exemplary embodiments of this disclosure, a unique add-an-event button may be set on the event building block triggering region 103 in the target interface 10. The add-an-event button may be displayed at any position in the target interface 10. For example, the add-an-event button may be placed in the middle of the target interface 10 alone. After the user clicks the add-an-event button, an event building block list pops up, so that the user can add an event building block for the target role 105 in a quite convenient and rapid manner.

In exemplary embodiments of this disclosure, a preset touch position may be set in the event building block triggering region 103 of the target interface 10. Whether the user triggers the preset touch position may be detected when a finger or a mouse is located at an edge or slides to the edge. The edge may be an edge of the preset touch position. If the preset touch position is touched, it is determined that an event building block needs to be added for the target role 105.

In step 203, in response to detecting a selection operation on a first event building block in the event building block set, the first event building block corresponding to the target role is added to a visual programming region of the target interface.

In an exemplary embodiment of this disclosure, an event building block set is displayed in the event building block triggering region 103. The user may perform a selection operation on a first event building block in the event building block set. When the selection operation is detected, a first event building block corresponding to the target role 105 may be added to the visual programming region 102 in the target interface 10 in response to the selection operation. The first event building block may be any event building block in the event building block set. The first event building block added to the visual programming region 102 of the target interface 10 corresponds to the foregoing determined target role 105. When a new target role 105 is created, a corresponding event building block further needs to be added again for the new target role 105. The first event building block may be added to the visual programming region 102 according to a fixed position. For example, a newly added event building block is displayed in a fixed position of the visual programming region 102. Certainly, it is not limited that, the user may alternatively control movement of an added event building block in the visual programming region 102 based on a requirement of the user, to change a position of the event building block in the visual programming region 102. For details, reference may be made to the descriptions in the subsequent exemplary embodiments.

For example, in a visual programming process, considering that an operation of adding an event building block is an operation that is necessarily experienced by the user, an add-an-event button may be separately used as an entrance button and provided to the user in an exemplary embodiment of this disclosure. When the user uses building blocks to write a small game, the user may quickly add an event building block to the visual programming region 102 for the target role 105 by using the entrance button, for example, add an event building block of the following event types, including an event building block when a game starts, an event building block when a role is clicked, or an event building block when a screen is clicked.

In exemplary embodiments of this disclosure, a plurality of event building blocks in the event building block set are displayed in the event building block triggering region 103. For example, the plurality of event building blocks may be displayed according to a specific order. For example, an order for each of the plurality of event building blocks may be determined according to a preset rule, and the plurality of event building blocks are displayed according to the order. For example, the plurality of event building blocks may be automatically sorted according to an application type to which the target role 105 belongs, or automatically sorted according to frequencies of addition of the plurality of event building blocks, or automatically sorted according to a programming intention for the target role 105.

For example, a plurality of building blocks in the event building block set may be automatically sorted in the event building block triggering region 103 in a plurality of manners, and a sorting result of the plurality of event building blocks in the event building block set may further be adjusted in real time according to a requirement of a programming user. For example, automatic sorting is performed according to an application type to which the target role 105 belongs. For example, when the target role 105 belongs to a puzzle game application, an arrangement position of an event building block in high correlation with the puzzle game application is near the front, and an arrangement position of an event building block in relatively low correlation with the puzzle game application is near the back. In another example, automatic sorting is performed according to frequencies of addition of the plurality of event building blocks. That is, statistics on which type of event building blocks are frequently added and which type of event building blocks are not frequently added may be dynamically performed by using a visual programming tool, and the event building blocks are sorted sequentially in descending order according to frequencies of addition of the event building blocks. In another example, automatic sorting is performed according to a programming intention of the target role 105. For example, the plurality of event building blocks may be automatically sorted according to a programming intention of the user, an arrangement position of an event building block that conforms to the programming intention of the user is near the front, and an arrangement position of an event building block that does not conform to the programming intention of the user is near the back. In exemplary embodiments of this disclosure, the sorting result of the plurality of event building blocks in the event building block triggering region 103 may be determined according to an actual scenario.

In exemplary embodiments of this disclosure, the detecting a selection operation on any event building block in the event building block set includes the following steps. In a first step, an event selection button corresponding to each event building block in the event building block set is detected on the event building block triggering region 103, and, according to a selected event selection button, a selection operation is performed on an event building block corresponding to the selected event selection button. In a second step, a preset touch position corresponding to each event building block is detected in the event building block set on the event building block triggering region 103, and, according to a touched preset touch position, a selection operation is performed on an event building block corresponding to the touched preset touch position.

Optionally, the event building block triggering region 103 may include a plurality of event selection buttons set in the target interface 10. Each event building block in the event building block set corresponds to one event selection button. That is, the event building blocks are in a one-to-one correspondence with the event selection buttons. After a selected event selection button is obtained, a selection operation on an event building block corresponding to the selected event selection button is responded. For example, a plurality of event selection buttons is displayed on the target interface 10. For example, the user clicks a specific event selection button, then an event building block corresponding to the selected event selection button needs to be added. The user may add the event building block for the target role 105 in a quite convenient and rapid manner.

The event building block triggering region 103 may include a plurality of preset touch positions set in the target interface 10. Each event building block in the event building block set corresponds to one preset touch position. That is, the event building blocks are in a one-to-one correspondence with the preset touch positions. After a touched preset touch position is obtained, a selection operation on an event building block corresponding to the touched preset touch position is responded. For example, a plurality of preset touch positions is displayed on the target interface 10. Whether the user triggers a preset touch position is detected when a finger or a mouse is located at an edge or slides to the edge. The edge may be an edge of the preset touch position. Then, an event building block corresponding to a touched preset touch position needs to be added. The user may add the event building block for the target role 105 in a quite convenient and rapid manner.

In exemplary embodiments of this disclosure, the first event building block includes a first begin block and a first end block. The first begin block and the first end block are arranged transversely or arranged longitudinally in the visual programming region 102.

Figure 4:
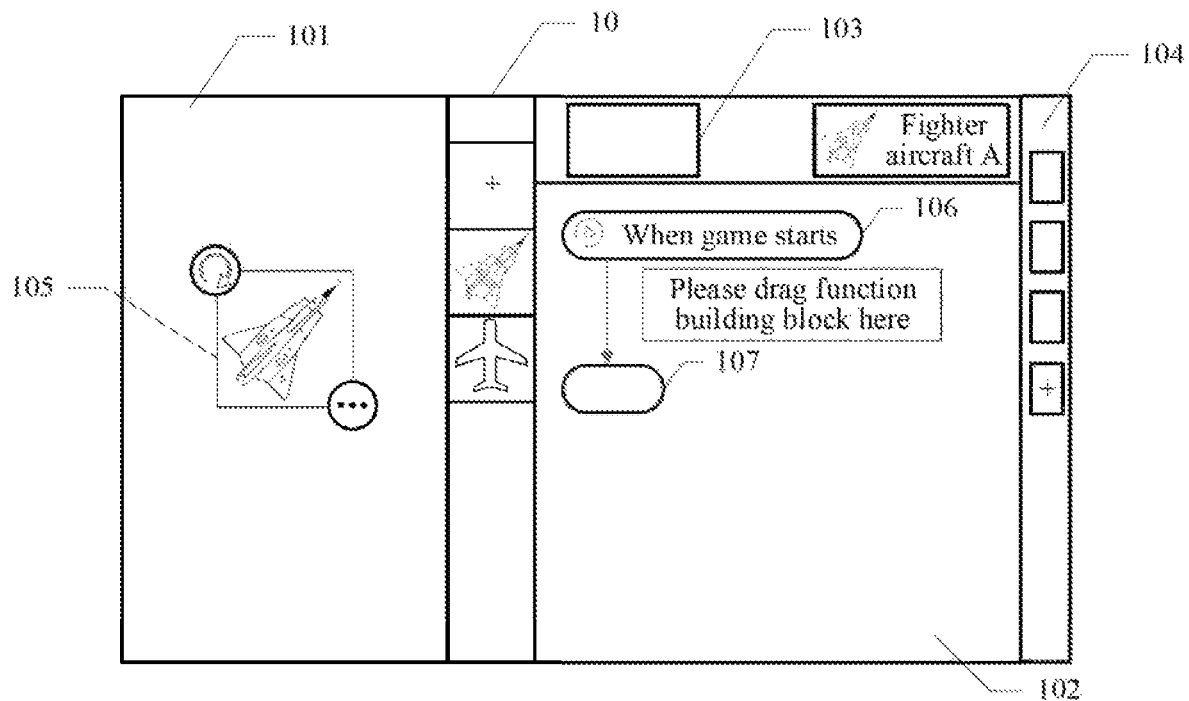
FIG. 4 is a schematic diagram of a target interface of unfolding an event building block according to an exemplary embodiment of this disclosure.

FIG. 4 is a schematic diagram of a target interface of unfolding an event building block according to an exemplary embodiment of this disclosure. All event building blocks added in the visual programming region 102 may include a begin block 106 and an end block 107. As shown in FIG. 4, an event building block is an event building block triggered when a game starts. The event building block may include a begin block and an end block. An arrangement manner of the begin block and the end block in the visual programming region 102 may include at least being arranged transversely or being arranged longitudinally. Being arranged transversely refers to an arrangement manner of an event building block in a case that the event building block is folded, and the begin block and the end block are required to be in the same row when being arranged transversely. Being arranged longitudinally refers to an arrangement manner of an event building block in a case that the event building block is unfolded, and the begin block and the end block are required to be in the same column when being arranged longitudinally. In an exemplary embodiment of this disclosure, the arrangement manner between the begin block and the end block may be determined according to an operation on the event building block by the user, and this is not limited herein.

Optionally, a shape of the event building block may change with a change of the arrangement manner of the begin block and the end block, or may keep unchanged. For example, as shown in FIG. 4, when the begin block and the end block are arranged longitudinally, the event building block is in a shape of a letter "E" with an "I" therein, and as shown in FIG. 5, when the begin block and the end block are arranged transversely, the event building block is in a shape of a symbol "-".

In exemplary embodiments of this disclosure, the first begin block is associated with the first end block by using a first connector in a case that the first begin block and the first end block are arranged transversely in the visual programming region 102. The first begin block is associated with the first end block by using a second connector in a case that the first begin block and the first end block are arranged longitudinally in the visual programming region 102.

The begin block and the end block included in the event building block may be associated with each other by using a different connector when the event building block has a different state. The connector refers to an association symbol connecting a begin block and an end block. The connector may have a plurality of shapes, such as an arrow shape, a straight line shape, an ellipsis shape, and a polyline shape. In an exemplary embodiment of this disclosure, when the user needs to fold the first event building block, the first begin block and the first end block are arranged transversely, and the first begin block is associated with the first end block by using a first connector. The first connector may be a connector in any shape. For example, the first connector may be a dashed line connector or a straight line connector. When the user needs to unfold the first event building block, the first begin block and the first end block are arranged longitudinally. The first begin block is associated with the first end block by using a second connector. The second connector may be a connector in any shape. For example, the second connector may be a vertical straight line connector, a curve connector, a polyline connector, which is not limited herein. In an exemplary embodiment of this disclosure, the first connector and the second connector are connectors of two different types. The user can see the two types of connectors from the target interface 10, to determine an arrangement manner of the begin block and the end block.

Figure 5:
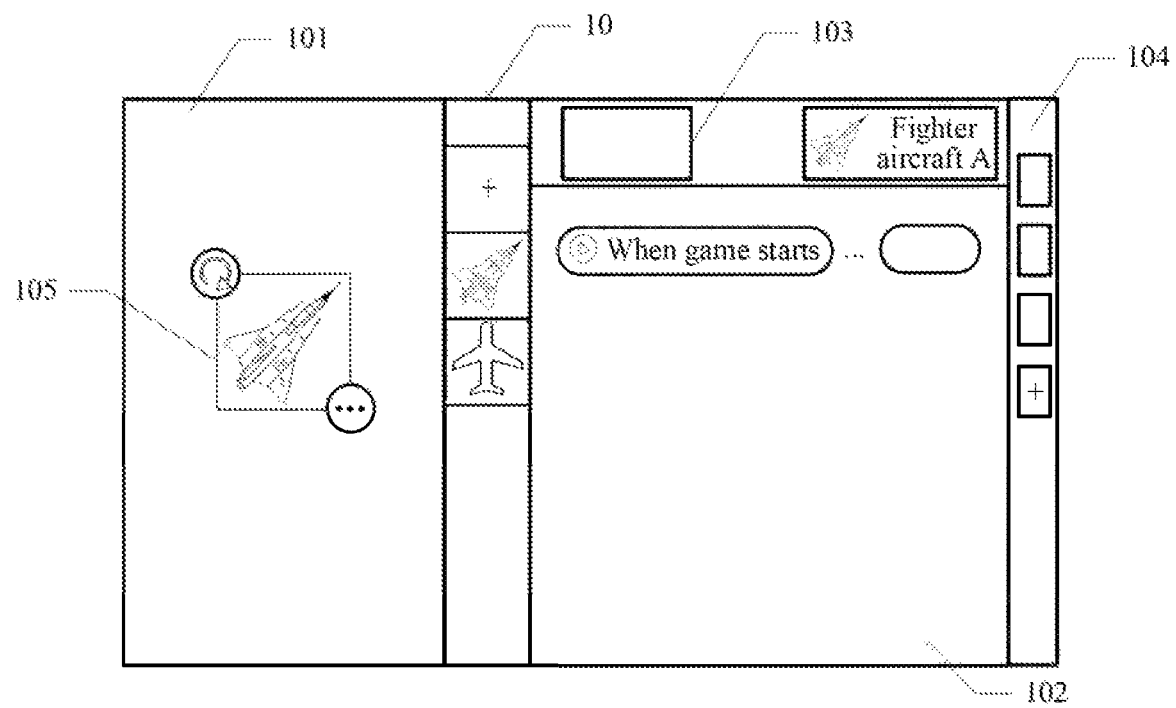
FIG. 5 is a schematic diagram of a target interface of folding an event building block according to an exemplary embodiment of this disclosure.

FIG. 5 is a schematic diagram of a target interface of folding an event building block according to an exemplary embodiment of this disclosure. In exemplary embodiments of this disclosure, the first connector includes an omitting identifier used for indicating that the first event building block is capable of being unfolded. When the user can see the ellipsis connector from the target interface 10, it is determined that the first event building block can be unfolded. In this case, the user may add a function building block corresponding to the first event building block to the visual programming region 102. For details, refer to the descriptions in the subsequent step 204.

In exemplary embodiments of this disclosure, after the adding a first event building block corresponding to the target role 105 to a visual programming region 102 of the target interface 10 in step 203, the method provided in an exemplary embodiment of this application, in response to detecting a selection operation on a second event building block in the event building block set, the second event building block corresponding to the target role 105 is added to the visual programming region 102 of the target interface 10. The second event building block and the first event building block are arranged in a longitudinally aligned manner in the visual programming region 102. The second event building block may be any event building block in the event building block set.

The user may add a plurality of event building blocks for the same target role 105 on the target interface 10. For example, after a first event building block is added for a specific target role 105, a second event building block may further be added based on a similar selection operation. The second event building block and the first event building block are arranged on the visual programming region 102 in a longitudinally aligned manner. The longitudinally aligned manner means that the plurality of event building blocks on the visual programming region 102 are located at different rows, but the event building blocks are aligned. Therefore, the user may determine, based on the aligned arrangement of the plurality of event building blocks, that the event building blocks belong to the same role, thereby facilitating the user to perform flexible and quick programming on the visual programming region 102.

In exemplary embodiments of this disclosure, after the adding a first event building block corresponding to the target role 105 to a visual programming region 102 of the target interface 10 in step 203, in the method provided in an exemplary embodiment of this disclosure, in response to detecting a selection operation on a second event building block in the event building block set, the second event building block corresponding to the target role 105 is added to the visual programming region 102 of the target interface 10. The second event building block and the first event building block are arranged in a transversely aligned manner in the visual programming region 102. The second event building block may be any event building block in the event building block set.

The user may add a plurality of event building blocks for the same target role 105 on the target interface 10. For example, after a first event building block is added for a specific target role 105, a second event building block may further be added based on a similar selection operation. The second event building block and the first event building block are arranged on the visual programming region 102 in a transversely aligned manner. The transversely aligned manner means that the plurality of event building blocks on the visual programming region 102 are located at different columns, but the event building blocks are aligned. Therefore, the user may determine, based on the aligned arrangement of the plurality of event building blocks, that the event building blocks belong to the same role, thereby facilitating the user to perform flexible and quick programming on the visual programming region 102.

In exemplary embodiments of this disclosure, event building blocks arranged longitudinally are moved transversely in the visual programming region 102, and in response to detecting that the event building blocks arranged longitudinally are released, the event building blocks moved transversely are automatically reset in the visual programming region 102. Function building blocks arranged longitudinally are moved transversely in the visual programming region 102, and in response to detecting that the function building blocks arranged longitudinally are released, the function building blocks moved transversely are automatically reset in the visual programming region 102.

If the user transversely moves building blocks (for example, including event building blocks or function building blocks) arranged longitudinally in the visual programming region 102, when the user leaves hold of the building blocks, the building blocks are released. In this case, the moved building blocks are automatically reset, so that building blocks (for example, including event building blocks or function building blocks) in the visual programming region 102 are arranged in an aligned manner, thereby facilitating the user to perform a subsequent programming operation.

Figure 6:
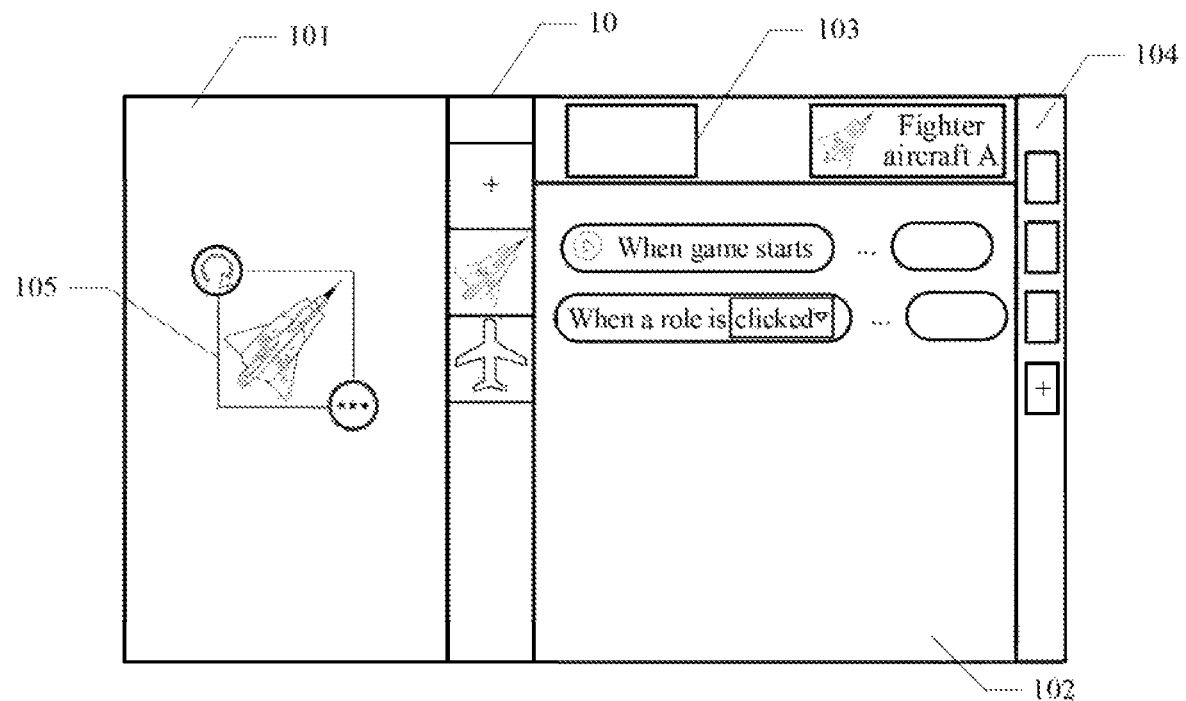
FIG. 6 is a schematic diagram of a target interface of adding two event building blocks according to an exemplary embodiment of this disclosure.

For example, FIG. 6 is a schematic diagram of the target interface 10 of adding two event building blocks according to an exemplary embodiment of this disclosure. The two event building blocks are an event building block triggered when a game starts and an event building block triggered when a role is clicked. The two event building blocks are arranged in a longitudinally aligned manner on the visual programming region 102. For example, as shown in FIG. 6, the event building blocks are arranged longitudinally with left sides aligned. The user may view all event building blocks owned by a target role 105 rapidly and clearly. All the event building blocks owned by the target role 105 are all event building blocks added for the target role 105 by the user. All the event building blocks correspond to the target role 105.

It is not limited that, in an exemplary embodiment of this disclosure, a plurality of event building blocks may be added for the same target role 105, and the two event building blocks shown in FIG. 6 is not a limitation.

In exemplary embodiments of this disclosure, after the adding a first event building block corresponding to the target role 105 to a visual programming region of the target interface in step 203, in the method provided in an exemplary embodiment of this disclosure an operation option menu for the first event building block is displayed in the visual programming region 102 in response to detecting an edition operation on the first event building block.

Figure 7:
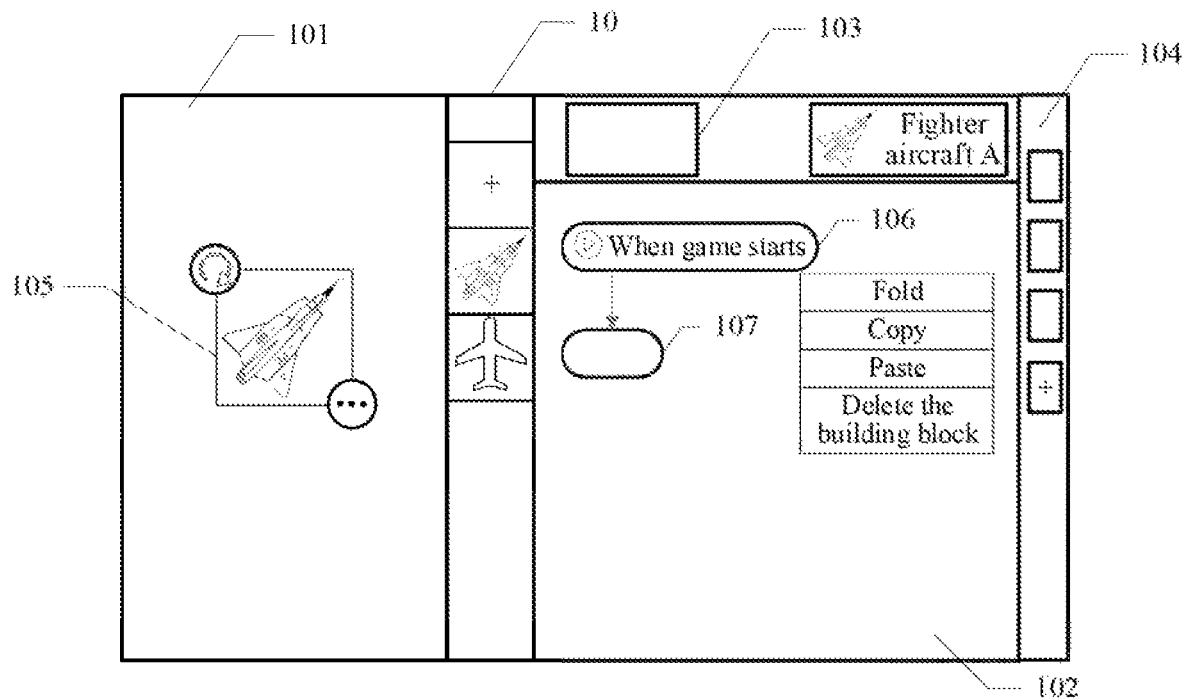
FIG. 7 is a schematic diagram of a target interface of adding an operation option menu to a event building block according to an exemplary embodiment of this disclosure.

In an exemplary embodiment of this disclosure, after adding the first event building block, the user may further perform an edition operation on the first event building block. In response to the edition operation on the first event building block, an operation option menu for the first event building block is displayed in the visual programming region 102. The operation option menu includes options of operations that the user may perform on the first event building block. FIG. 7 is a schematic diagram of a target interface 10 of adding an operation option menu to an event building block according to an embodiment of this application. After the event building block is selected, the option menu may be displayed through a double-click operation, and operations for some functions are performed. The operations may include, for example, at least include unfolding a building block, folding a building block, copying and pasting, deleting all building blocks, and the like.

In exemplary embodiments of this disclosure, after the adding a first event building block corresponding to the target role to a visual programming region of the target interface in step 203, in the method provided in an exemplary embodiment of this disclosure, in response to detecting a drag operation on the first event building block, the first event building block is controlled to move in the visual programming region 102, to adjust an order in which the first event building block and other event building blocks are arranged, and a position of the first event building block in the visual programming region 102.

In an exemplary embodiment of this disclosure, after adding the first event building block, the user may further perform a drag operation for the first event building block. In response to the drag operation on the first event building block, the first event building block is controlled to move in the visual programming region 102, to adjust an order in which the first event building block and other event building blocks are arranged, and a position of the first event building block in the visual programming region 102. For example, the user holds down and drags the event building block, so that an order corresponding to the event building block and a position of the event building block can be adjusted through vertically dragging. A layout of the building blocks is performed in a customized manner, thereby facilitating the user to perform visual programming for the target role 105.

In step 204, in response to detecting a selection operation on a first function building block in at least one function building block corresponding to the first event building block displayed in a function building block triggering region of the target interface, the first function building block corresponding to the target role is added to the visual programming region.

In an exemplary embodiment of this disclosure, after the first event building block corresponding to the target role 105 is added to the visual programming region 102 of the target interface 10, the user may further perform addition of a function building block corresponding to the first event building block on the target interface 10.

In an exemplary embodiment of this disclosure, at least one function building block corresponding to the first event building block is displayed in the function building block triggering region 104. The user may perform a selection operation on a first function building block in the at least one function building block. When the selection operation is detected, a first function building block corresponding to the target role 105 may be added to the visual programming region 102 in the target interface 10 in response to the selection operation. The first function building block may be any function building block in the at least one function building block corresponding to the first event building block. The first function building block added to the visual programming region 102 of the target interface 10 corresponds to the foregoing determined target role 105. When a new target role 105 is created, a corresponding function building block further needs to be added again for the new target role 105. The first function building block may be added to the visual programming region 102 according to a fixed position. For example, a newly added function building block is displayed in a fixed position of the visual programming region 102. Certainly, it is not limited that, the user may alternatively control movement of an added function building block in the visual programming region 102 based on a requirement of the user. For details, refer to the descriptions in the subsequent exemplary embodiments.

In exemplary embodiments of this disclosure, after the adding a first function building block corresponding to the target role to a visual programming region in step 204, in the method provided in an exemplary embodiment of this application further includes the following, in response to detecting a selection operation on a second function building block in the at least one function building block corresponding to the first event building block displayed in the function building block triggering region 104 of the target interface 10, the second function building block corresponding to the target role 105 is added to the visual programming region 102. The first function building block and the second function building block are displayed in combination or side by side in a first event region. The second function building block may be any function building block in the at least one function building block corresponding to the first event building block.

The user may add a plurality of function building blocks for the same target role 105 on the target interface 10. For example, after a first function building block is added for a specific target role 105, a second function building block may further be added based on a similar selection operation. The second function building block and the first function building block are displayed in combination or side by side on the visual programming region 102. The manner of being displayed in combination means that the plurality of function building blocks on the visual programming region 102 are displayed together in combination. Being displayed side by side means that the plurality of function building blocks on the visual programming region 102 are respectively located at different rows, but the function building blocks are aligned. Therefore, the user may determine, based on the combined display or side-by-side display of the plurality of function building blocks, that the function building blocks belong to the same role, thereby facilitating the user to perform flexible and quick programming on the visual programming region 102.

In exemplary embodiments of this disclosure, in the function building block triggering region 104, a plurality of function building blocks in the function building block set are automatically sorted according to an application type to which the target role 105 belongs, or automatically sorted according to frequencies of addition of the plurality of function building blocks, or automatically sorted according to a programming intention for the target role 105.

In an exemplary embodiment of this disclosure, the plurality of function building blocks in the function building block triggering region 104 may alternatively be arranged in a fixed arrangement manner, or be dynamically arranged according to a usage habit of the user, or be automatically arranged according to a programming intention of the user. For example, a plurality of function building blocks in the function building block set may be automatically sorted in the function building block triggering region 104 in a plurality of manners, and a sorting result of the plurality of building blocks in the function building block set may further be adjusted in real time according to a requirement of a programming user. For example, automatic sorting is performed according to an application type to which the target role 105 belongs. For example, when the target role 105 belongs to a puzzle game application, an arrangement position of a function building block in high correlation with the puzzle game application is near the front, and an arrangement position of a function building block in relatively low correlation with the puzzle game application is near the back. In another example, automatic sorting is performed according to frequencies of addition of the plurality of function building blocks. That is, statistics on which type of function building blocks are frequently added and which type of function building blocks are not frequently added may be dynamically performed by using a visual programming tool, and the function building blocks are sorted sequentially in descending order according to frequencies of addition of the function building block. In another example, automatic sorting is performed according to a programming intention of the target role 105. For example, the plurality of function building blocks may be automatically sorted according to a programming intention of the user, an arrangement position of a function building block that conforms to the programming intention of the user is near the front, and an arrangement position of a function building block that does not conform to the programming intention of the user is near the back. In an exemplary embodiment of this disclosure, the sorting result of the plurality of function building blocks in the function building block triggering region 104 may be determined according to an actual scenario.

Figure 8:
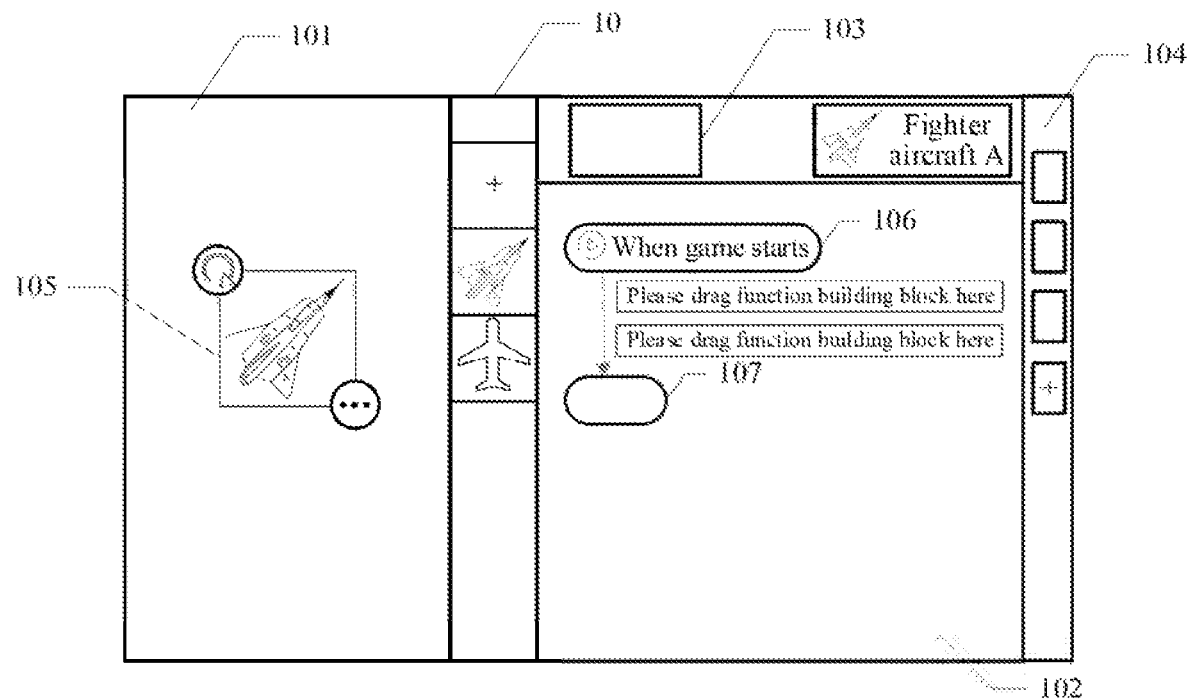
FIG. 8 is a schematic diagram of a target interface of adding two function building blocks to the same event building block according to an exemplary embodiment of this disclosure.

For example, FIG. 8 is a schematic diagram of a target interface of adding two function building blocks to the same event building block according to an exemplary embodiment of this disclosure. When the first event building block is in an unfolded state, the two function building blocks may be dragged together. For example, as shown in FIG. 8, the function building blocks are longitudinally arranged with left sides aligned. The user may view all event building blocks owned by one target role 105 and all function building blocks included in a specific event building block rapidly and clearly.

In an exemplary embodiment of this disclosure, a plurality of function building blocks may be added for the same target role 105, and the two function building blocks shown in FIG. 8 is not a limitation.

In exemplary embodiments of this disclosure, the adding, in response to detecting a selection operation on a first function building block in at least one function building block corresponding to the first event building block displayed in a function building block triggering region 104 of the target interface 10, the first function building block corresponding to the target role 105 to the visual programming region 102 in step 204 includes the following steps. In a first step, a building block unfolding identifier associated with the first event building block is displayed in the visual programming region 102 in a case that the first begin block and the first end block are arranged transversely in the visual programming region 102. In a second step, the first event building block is unfolded in response to detecting an unfolding instruction for the building block unfolding identifier, and, in the visual programming region 102, a first event region is displayed with the first event building block unfolded. In a third step, in response to detecting a selection operation on a first function building block in at least one function building block corresponding to the first event building block displayed in the function building block triggering region 104, the first function building block is determined. In a fourth step, the first function building block is added to the first event region in response to detecting a drag operation on the first function building block.

The first event building block includes a first begin block and a first end block. After the first event building block is added, if the first begin block and the first end block are arranged transversely in the visual programming region 102, the building block unfolding identifier associated with the first event building block is displayed in the visual programming region 102. The building block unfolding identifier is used for indicating that the first event building block is capable of being unfolded. For example, the building block unfolding identifier may be a symbol "+". If the user issues an unfolding instruction by using the building block unfolding identifier, the first event building block may be unfolded, and a first event region with the first event building block unfolded is displayed on the visual programming region 102. The first event region may be a region included in a case that the event building block is in a shape of a letter "E" with an "I" therein. After a first function building block is selected for the target role 105, a first function building block is added to the first event region in response to the drag operation on the first function building block. In an exemplary embodiment of this disclosure, the addition of the first function building block to the visual programming region 102 is completed on the first event region. Therefore, the first event region can only be formed after the first event building block is added, and then the first function building block can be added to the first event region, for example, filling with a function building block based on a half-surrounded structure of the event building block.

In exemplary embodiments of this disclosure, after the adding the first function building block to the first event region in response to detecting a drag operation on the first function building block in step 204, the method provided in this embodiment of this application further includes the following steps. In a first step, a building block folding identifier associated with the first event building block is displayed in the visual programming region 102 in a case that the first begin block and the first end block are arranged longitudinally in the visual programming region 102. In a second step, the first function building block in the first event region is hidden in response to detecting a folding instruction for the building block folding identifier.

The first event building block includes a first begin block and a first end block. After the first event building block is added, if the first begin block and the first end block are arranged longitudinally in the visual programming region 102, the building block folding identifier associated with the first event building block is displayed in the visual programming region 102. The building block folding identifier is used for indicating that the first event building block is capable of being folded. For example, the building block folding identifier may be a symbol "–". If the user issues a folding instruction by using the building block folding identifier, the first event building block may be folded, and a first function building block in the first event region is hidden. For example, the first event building block is in a shape of a letter "E" with an "I" therein. In this case, the first event building block may be folded (that is, be collapsed) according to the building block folding identifier, and the first function building block added in the first event region may also be folded.

For example, for a function building block included in each event building block, when the user clicks a minus icon "–", the function building block inside is hidden, and the event building block is folded. A shape of the folded event building block is an independent row, and the middle is filled with an ellipsis. When the user clicks a plus icon "+", a function building block inside the event building block is displayed, and the event building block is spread out to a plurality of rows, and is restored into the previous half-surrounded structure in a shape of a letter "E" with an "I" therein.

A manner of calculating a coordinate position of an adjacent building block of the event building block when the event building block is unfolded or folded is described below. The following is merely exemplary description, and is not intended to limit the exemplary embodiments of this disclosure.

For example, values of a horizontal coordinate x and a vertical coordinate y of each event building block in a main region of building blocks are calculated by using a program, and coordinates x of event building blocks are maintained locked, so that the event building blocks maintain left-aligned arrangement on the target interface 10. Coordinates of an upper left corner are used as reference coordinates (x=0, y=0), positions of vertical coordinates of new building blocks are calculated in a layout manner from top to bottom and from left to right, so that the building blocks are sequentially and neatly arranged.

A total occupied height Z is calculated in the following manner:

$$Z=M\times h,$$

where M represents a quantity of function building blocks in each event building block, h represents a height of each function building block, and when the user clicks a folding button, a new coordinate value obtained by subtracting the total occupied height Z from a coordinate Y of an adjacent building block of a function building block to be folded is the position of the adjacent building block.

When the user clicks an unfolding button, a new coordinate position can be obtained by adding a coordinate Y of an adjacent building block of a building block to be unfolded to the total occupied height Z.

When a building block is dragged, h is added to a Y-axis coordinate of a building block below a position of a dragged target, then a building block region to be added is available.

Classification for function building blocks is described below.

The first function building block is any one of the following function building blocks: a function building block of a logic type, a function building block of a basic building block type, a function building block of a fillable type, a function building block of a minimum building block unit type, and a function building block of an advanced function building block type.

Function building blocks in the embodiments of this application may be classified into five including function building blocks of a logic type, function building blocks of a basic building block type, function building blocks of a fillable type, function building blocks of a minimum building block unit type, and function building blocks of an advanced function building block type. The function building blocks of a fillable type refer to a type of function building blocks, other than variable building blocks, that can be filled with another building block. Each type of function building blocks may further include one or more function building blocks. Each type of function building blocks and function building blocks under the type may be determined according to an application scenario in the embodiments of this application, and this is not limited herein.

In exemplary embodiments of this disclosure, the function building block of a logic type, the function building block of a basic building block type, the function building block of a fillable type, the function building block of a minimum building block unit type, and the function building block of an advanced function building block type are identified and displayed in different colors. That is, when different types of function building blocks are added to the target interface, the same type of function building blocks are identified in the same color, and different types of function building blocks are identified in different colors, so that the user may determine a type corresponding to a function building block based on a color used for the function building block.

In exemplary embodiments of this disclosure, function building blocks may be classified into 11 classes, which are respectively a logic building block, a control building block, a motion building block, an appearance building block, an animation building block, a detection building block, an operation building block, a variable building block, a sound building block, a physical building block, and a component library building block. The 11 classes of function building blocks are classified according to use scenario logic in the exemplary embodiments of this disclosure, to obtain five types. A first type is a Logic type (for example, being represented in blue), which is a logic building block. A second type is a Basic building block type (for example, being represented in dark blue), which includes a control building block, a motion building block, appearance building block, an animation building block, a sound building block, and a physical building block. A third type is a type of function building blocks, other than variable building blocks, that can be filled with another building block (for example, being represented in sky blue), such as a detection building block and operation building block. A fourth type is a Minimum building block unit type (for example, being represented in pink), that can include a variable building block. A fifth type is an Advanced function building block type (for example, being represented in orange), such as a component library building block.

Figure 9:
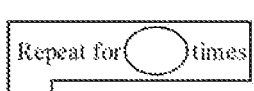
FIG. 9 is a schematic diagram of classification of function building blocks according to an exemplary embodiment of this disclosure.
Figure 9:
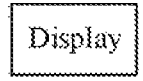
Figure 9:
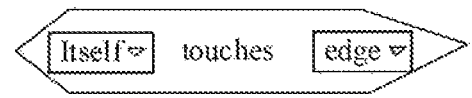
Figure 9:
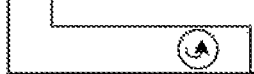
Figure 9:
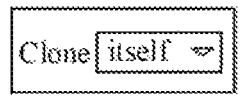
Figure 9:
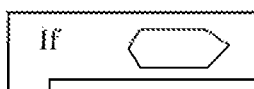
Figure 9:
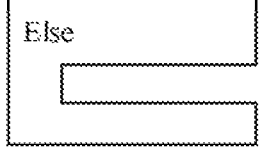
Figure 9:
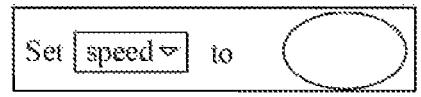
Figure 9:
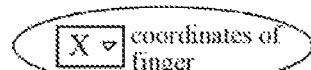
Figure 9:
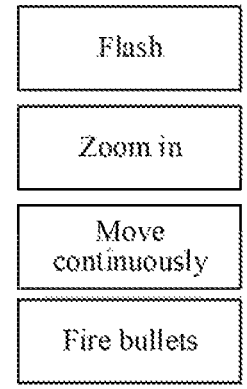

For example, FIG. 9 is a schematic diagram of classification of function building blocks according to an embodiment of this application. The function building blocks of a logic type include a "repeat for_times" function building block and a "if_, else_" function building block. The function building blocks of a basic building block type include a "display" function building block, a "clone itself" function building block, and a "set a speed to_" function building block. The function building blocks of a fillable type include a "touch an edge by itself" function building block, a "_is greater than_" function building block, an "X coordinates of finger" function building block, and a "global timer" function building block. The function building blocks of a minimum building block unit type include a "quantity of monsters" function building block, an "initial speed" function building block, and a "score" function building block. The function building blocks of an advanced function building block type include a "flash" function building block, a "zoom in" function building block, a "move continuously" function building block, and a "fire bullets" function building block.

Figure 10:
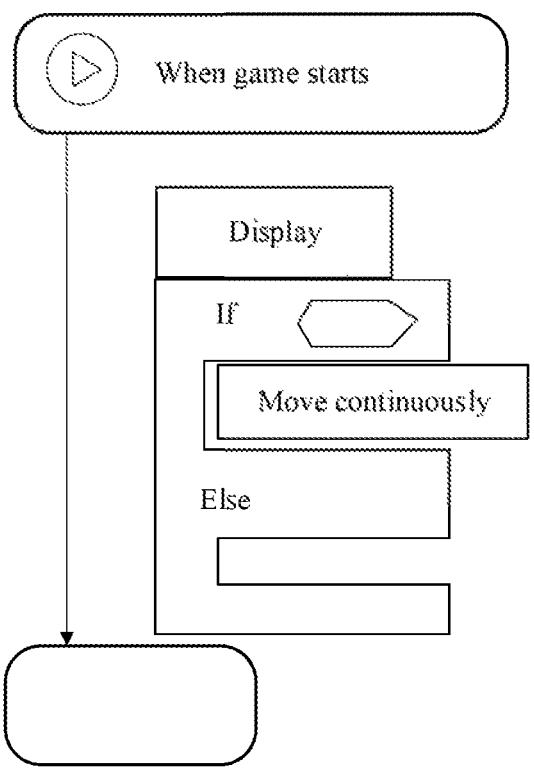
FIG. 10 is a schematic diagram of use of a plurality of function building blocks in combination according to an exemplary embodiment of this disclosure.

FIG. 10 is a schematic diagram of use of a plurality of function building blocks in combination according to an exemplary embodiment of this disclosure. For an event building block added for the target role and triggered when a game starts, a "display" function building block, a "if_, else_" function building block, and a "move continuously" function building block may be sequentially added. In an exemplary embodiment of this disclosure, addition of an event building block may be performed as a response first, and after the event building block is added, a selection operation on at least one function building block corresponding to the event building block is then responded, and finally, a function building block is added according to a requirement of the target role for functions. In exemplary embodiments of this disclosure, functions of the target role may be set to function building blocks independent from event building blocks, to improve a setting success rate of function building blocks, and avoid a failure in building block function settings.

An exemplary embodiment of this disclosure further provides a method for performing visual programming, including the following steps. In a first step, a target interface is displayed. In a second step, in response to detecting a selection operation on any event building block in an event building block set of the target interface, a first event building block corresponding to a target role is added to a visual programming region of the target interface. The event building block set is displayed in an event building block triggering region of the target interface, and the target role is displayed in a visual layout region of the target interface. In a third step, in response to detecting a selection operation on at least one function building block corresponding to the first event building block displayed in a function building block triggering region of the target interface, a first function building block corresponding to the target role is added to the visual programming region of the target interface.

A target interface is first unfolded, and after the target interface is unfolded, a visual programming region, an event building block triggering region, and a function building block triggering region are determined. For addition processes and an operation processes for an event building block and a function building block, refer to the descriptions in the foregoing embodiments, and details are not described herein again.

It can be appreciated from the foregoing descriptions of the exemplary embodiments of this disclosure that, a target role is first determined in a visual layout region of a target interface. Then an event building block set is displayed in an event building block triggering region of the target interface. Subsequently, in response to detecting a selection operation on a first event building block in the event building block set, the first event building block corresponding to the target role is added to a visual programming region of the target interface. In response to detecting a selection operation on a first function building block in at least one function building block corresponding to the first event building block displayed in a function building block triggering region of the target interface, the first function building block corresponding to the target role is added to the visual programming region. In the exemplary embodiments of this disclosure, the event building block triggering region and the function building block triggering region may be separately set in the target interface, so that an event building block and a function building block can be deployed in respective regions to which they are added, thereby avoiding a misoperation (or malfunction) problem. In addition, in the exemplary embodiments of this disclosure, the addition of the first event building block is performed as a response first, and after the first event building block is added, the selection operation on the first function building block in the at least one function building block corresponding to the first event building block is then responded, and the first function building block is added according to a requirement of the target role for functions. In the exemplary embodiments of this disclosure, functions of the target role may be set to function building blocks independent from event building blocks, to improve a setting success rate of function building blocks, and avoid a failure in building block function settings.

The foregoing exemplary method embodiments are expressed as a series of action combinations for the purpose of brief description, but a person skilled in the art will recognize that because some steps may be performed in other sequences or simultaneously according to the exemplary embodiments of this disclosure, the exemplary embodiments of this disclosure are not limited to a described action sequence. In addition, it can be appreciated that the exemplary embodiments described in this specification are all exemplary embodiments, and therefore, an action and a module involved are not necessarily required by the exemplary embodiments of this disclosure.

To implement the foregoing solutions in the exemplary embodiments of this disclosure, related apparatuses for implementing the foregoing solutions are described below.

Figure 11:
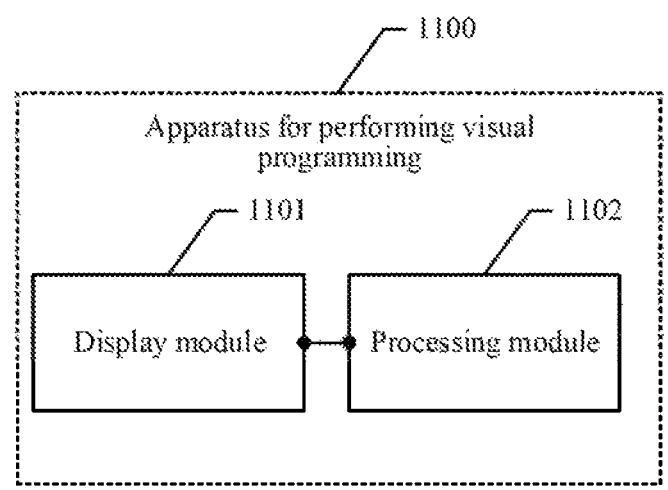
FIG. 11 is a schematic diagram of a composition structure of an apparatus for performing visual programming according to an exemplary embodiment of this disclosure.

Referring to FIG. 11, an apparatus 1100 for performing visual programming provided in an embodiment of this application may include a display module 1101 and a processing module 1102, which can be implemented by circuitry. The processing module 1102 is configured to determine a target role in a visual layout region of a target interface, and the display module 1101 is configured to display an event building block set in an event building block triggering region of the target interface. The processing module 1102 is also configured to add, in response to detecting a selection operation on a first event building block in the event building block set, the first event building block corresponding to the target role to a visual programming region of the target interface. The processing module 1102 is further configured to add, in response to detecting a selection operation on a first function building block in at least one function building block corresponding to the first event building block displayed in a function building block triggering region of the target interface, the first function building block corresponding to the target role to the visual programming region.

An exemplary embodiment of this disclosure provides an apparatus for performing visual programming. The apparatus for performing visual programming includes a display module and a processing module, which can be implemented by circuitry. The display module is configured to display a target interface. The processing module is configured to add, in response to detecting a selection operation on a first event building block in an event building block set of the target interface, the first event building block corresponding to a target role to a visual programming region of the target interface. The event building block set is displayed in an event building block triggering region of the target interface, and the target role is displayed in a visual layout region of the target interface. The processing module is also configured to add, in response to detecting a selection operation on a first function building block in at least one function building block corresponding to the first event building block displayed in a function building block triggering region of the target interface, the first function building block corresponding to the target role to the visual programming region of the target interface.

In a possible implementation, the first event building block includes a first begin block and a first end block. The first begin block and the first end block are arranged transversely or arranged longitudinally in the visual programming region.

In a possible implementation, the first begin block is associated with the first end block by using a first connector in a case that the first begin block and the first end block are arranged transversely in the visual programming region. The first begin block is associated with the first end block by using a second connector in a case that the first begin block and the first end block are arranged longitudinally in the visual programming region.

In a possible implementation, the first connector includes an omitting identifier used for indicating that the first event building block is capable of being unfolded.

In a possible implementation, the display module is further configured to display a building block unfolding identifier associated with the first event building block in the visual programming region in a case that the first begin block and the first end block are arranged transversely in the visual programming region. The processing module is further configured to unfold the first event building block in response to detecting an unfolding instruction for the building block unfolding identifier, and the display module is further configured to display, in the visual programming region, a first event region with the first event building block unfolded. The processing module is further configured to determine, in response to detecting a selection operation on a first function building block in at least one function building block corresponding to the first event building block displayed in the function building block triggering region, the first function building block. The processing module is further configured to add the first function building block to the first event region in response to detecting a drag operation on the first function building block.

In a possible implementation, the display module is further configured to, after the adding the first function building block to the first event region in response to detecting a drag operation on the first function building block, display a building block folding identifier associated with the first event building block in the visual programming region in a case that the first begin block and the first end block are arranged longitudinally in the visual programming region. The processing module is further configured to hide the first function building block in the first event region in response to detecting a folding instruction for the building block folding identifier.

In a possible implementation, the processing module is further configured to, after the adding a first event building block corresponding to the target role to a visual programming region of the target interface, add, in response to detecting a selection operation on a second event building block in the event building block set. The second event building block corresponds to the target role to the visual programming region of the target interface. The second event building block and the first event building block are arranged in a longitudinally aligned manner in the visual programming region.

In a possible implementation, the processing module is further configured to, after the adding a first function building block corresponding to the target role to the visual programming region, add, in response to detecting a selection operation on a second function building block in the at least one function building block corresponding to the first event building block displayed in the function building block triggering region of the target interface, the second function building block corresponding to the target role to the visual programming region. The first function building block and the second function building block are displayed in combination or side by side in a first event region.

In a possible implementation, the first function building block is any one a function building block of a logic type, a function building block of a basic building block type, a function building block of a fillable type, a function building block of a minimum building block unit type, and a function building block of an advanced function building block type.

In a possible implementation, the function building block of a logic type, the function building block of a basic building block type, the function building block of a fillable type, the function building block of a minimum building block unit type, and the function building block of an advanced function building block type are displayed in different colors.

In a possible implementation, the processing module is further configured to, after the adding a first event building block corresponding to the target role to a visual programming region of the target interface, control, in response to detecting a drag operation on the first event building block, the first event building block to move in the visual programming region, to adjust an order in which the first event building block and other event building blocks are arranged, and a position of the first event building block in the visual programming region.

In a possible implementation, the display module is further configured to, after the adding a first event building block corresponding to the target role to a visual programming region of the target interface, display an operation option menu for the first event building block in the visual programming region in response to detecting an edition operation on the first event building block.

In a possible implementation, the processing module is further configured to detect an event selection button corresponding to each event building block in the event building block set on the event building block triggering region, and respond, according to a selected event selection button, with a selection operation on an event building block corresponding to the selected event selection button, or detect a preset touch position corresponding to each event building block in the event building block set on the event building block triggering region, and respond, according to a touched preset touch position, with a selection operation on an event building block corresponding to the touched preset touch position.

In exemplary embodiments of this disclosure, in the event building block triggering region, a plurality of event building blocks in the event building block set are automatically sorted according to an application type to which the target role belongs, or automatically sorted according to frequencies of addition of the plurality of event building blocks, or automatically sorted according to a programming intention for the target role.

In exemplary embodiments of this disclosure, event building blocks arranged longitudinally are moved transversely in the visual programming region, and in response to detecting that the event building blocks arranged longitudinally are released, the event building blocks moved transversely are automatically reset in the visual programming region. Function building blocks arranged longitudinally may also be moved transversely in the visual programming region; and in response to detecting that the function building blocks arranged longitudinally are released, where the function building blocks moved transversely are automatically reset in the visual programming region.

In exemplary embodiments of this disclosure, in the function building block triggering region, a plurality of function building blocks in the function building block set are automatically sorted according to an application type to which the target role belongs, or automatically sorted according to frequencies of addition of the plurality of function building blocks, or automatically sorted according to a programming intention for the target role.

It can be appreciated that, a target role is first determined in a visual layout region of a target interface. Then an event building block set is displayed in an event building block triggering region of the target interface. Subsequently, in response to detecting a selection operation on a first event building block in the event building block set, the first event building block corresponding to the target role is added to a visual programming region of the target interface. In response to detecting a selection operation on a first function building block in at least one function building block corresponding to the first event building block displayed in a function building block triggering region of the target interface, the first function building block corresponding to the target role is added to the visual programming region. In exemplary embodiments of this disclosure, the event building block triggering region and the function building block triggering region may be separately set in the target interface, so that an event building block and a function building block can be deployed in respective triggering regions, thereby avoiding a misoperation (or malfunction) problem. In addition, in exemplary embodiments of this disclosure, the addition of the first event building block is performed as a response first, and after the first event building block is added, the selection operation on the first function building block in the at least one function building block corresponding to the first event building block is then responded, and finally, the first function building block is added according to a requirement of the target role for functions. In exemplary embodiments of this disclosure, functions of the target role may be set to function building blocks independent from event building blocks, to improve a setting success rate of function building blocks, and avoid a failure in building block function settings.

Figure 12:
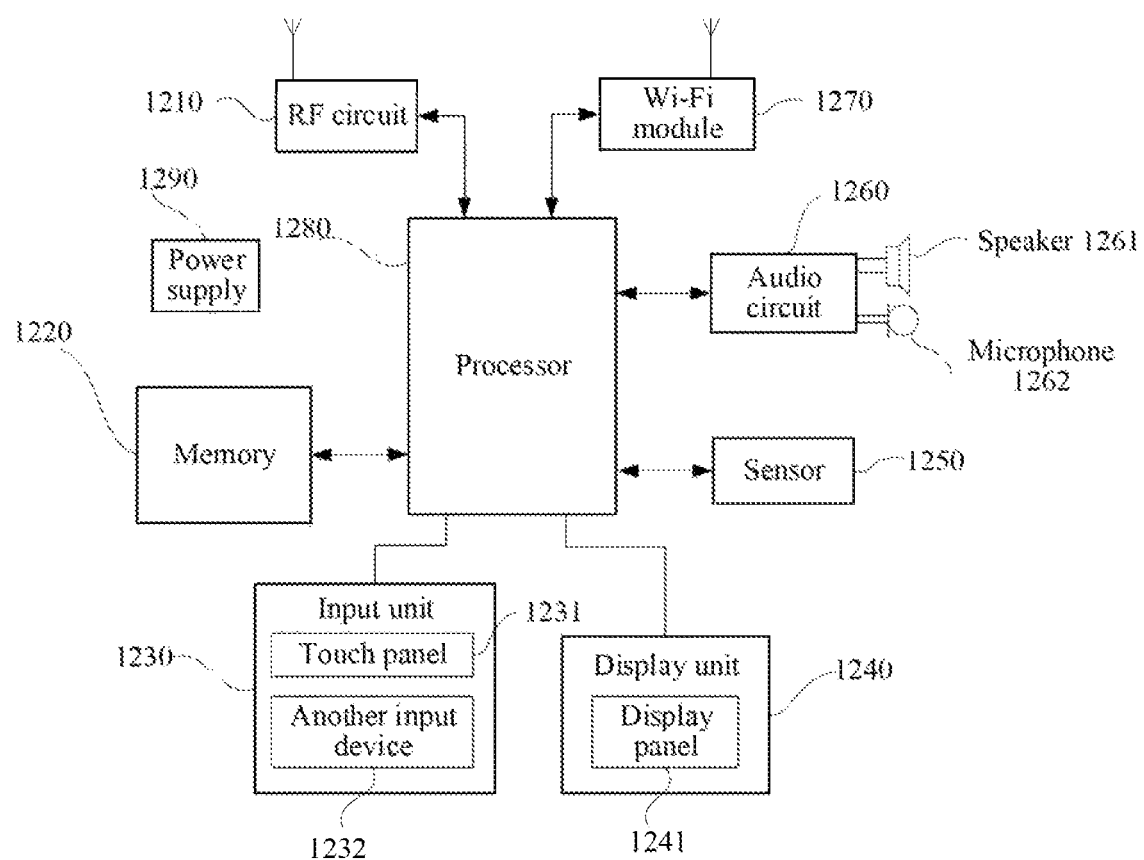
FIG. 12 is a schematic diagram of a composition structure of a terminal to which a method for performing visual programming is applicable according to an exemplary embodiment of this disclosure.

An exemplary embodiment of this disclosure further provides another terminal. As shown in FIG. 12, for ease of description, only parts related to the exemplary embodiments of this disclosure are shown. For technical details that are not disclosed, refer to the method part in the exemplary embodiments of this disclosure. The terminal may be any terminal device, including a mobile phone, a notebook computer, a desktop computer, a tablet computer, a personal digital assistant (PDA), a point of sales (POS), and an in-vehicle computer. For example, the terminal is a tablet computer.

FIG. 12 is a block diagram of the structure of a part of a tablet computer related to a terminal according to an exemplary embodiment of this disclosure. Referring to FIG. 12, the tablet computer includes components, such as a radio frequency (RF) circuit 1210, a memory 1220, an input unit 1230, a display unit 1240, a sensor 1250, an audio circuit 1260, a Wi-Fi module 1270, a processor 1280, and a power supply 1290. Persons skilled in the art will recognize that the structure of the tablet computer shown in FIG. 12 does not constitute a limitation on the tablet computer, and the tablet computer may include more components or fewer components than those shown in the figure, or some components may be combined, or a different component deployment may be used.

The following describes the components of the tablet computer with reference to FIG. 12.

The RF circuit 1210 may be configured to send and receive signals during an information receiving and sending process or a call process. Specifically, the RF circuit receives downlink information from a base station, then delivers the downlink information to the processor 1280 for processing, and sends designed uplink data to the base station. Usually, the RF circuit 1210 includes, but is not limited to, an antenna, at least one amplifier, a transceiver, a coupler, a low noise amplifier (LNA), and a duplexer. In addition, the RF circuit 1210 may also communicate with a network and another device through wireless communication. The wireless communication may use any communication standard or protocol, including but not limited to Global System for Mobile Communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 1220 may be configured to store the software programs and modules. The processor 1280 runs the software programs and modules stored in the memory 1220, to perform various function application of the tablet computer and data processing. The memory 1220 may mainly include a program storage area and a data storage area. The program storage area may store an operating system, an application required by at least one function (for example, a sound playback function and an image display function), and the like. The data storage area may store data (for example, audio data and an address book) created according to the use of the tablet computer, and the like. In addition, the memory 1220 may include a high speed random-access memory, and may also include a non-volatile memory, for example, at least one magnetic disk storage device, a flash memory, or another volatile solid-state storage device.

The input unit 1230 may include circuitry configured to receive input digit or character information, and generate a key signal input related to the user setting and function control of the tablet computer. Optionally, the input unit 1230 may include a touch panel 1231 and another input device 1232. The touch panel 1231, which may also be referred to as a touch screen, may collect a touch operation of a user on or near the touch panel 1231 (such as an operation of a user on the touch panel 1231 or near the touch panel 1231 by using any suitable object or accessory such as a ringer or a stylus), and drive a corresponding connection apparatus according to a preset program. Optionally, the touch panel 1231 may include two parts, a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and transmits the touch point coordinates to the processor 1280. Moreover, the touch controller can receive and execute a command transmitted from the processor 1280. In addition, the touch panel 1231 may be implemented by using various types, such as a resistive type, a capacitive type, an infrared type, and a surface acoustic wave type. In addition to the touch panel 1231, the input unit 1230 may further include the other input device 1232. Optionally, the other input device 1232 may include, but is not limited to, one or more of a physical keyboard, a functional key (such as a volume control key or a switch key), a track ball, a mouse, and a joystick.

The display unit 1240 may include circuitry configured to display information inputted by the user or information provided for the user, and various menus of the tablet computer. The display unit 1240 may include a display panel 1241. Optionally, the display panel 1241 may be configured by using a liquid crystal display (LCD), an organic light-emitting diode (OLED), or the like. Further, the touch panel 1231 may cover the display panel 1241. After detecting a touch operation on or near the touch panel 1231, the touch panel 1231 transfers the touch operation to the processor 1280, to determine a type of a touch event. Then, the processor 1280 provides a corresponding visual output on the display panel 1241 according to the type of the touch event. Although in FIG. 12, the touch panel 1231 and the display panel 1241 are used as two separate parts to implement input and output functions of the tablet computer, in some embodiments, the touch panel 1231 and the display panel 1241 may be integrated to implement the input and output functions of the tablet computer.

The tablet computer may further include at least one sensor 1250, such as an optical sensor, a motion sensor, and other sensors. Optionally, the optical sensor may include an ambient light sensor and a proximity sensor, where the ambient light sensor may adjust luminance of the display panel 1241 according to the luminance of the ambient light, and the proximity sensor may switch off the display panel 1241 and/or backlight when the tablet computer is moved to the ear. As one type of motion sensor, an accelerometer sensor can detect magnitude of accelerations in various directions (generally on three axes), may detect magnitude and a direction of the gravity when static, and may be applied to an application that recognizes the attitude of the tablet computer (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the tablet computer, are not further described herein.

With regard to the audio circuit 1260, a speaker 1261, and a microphone 1262 may provide audio interfaces between the user and the tablet computer. The audio circuit 1260 may convert received audio data into an electrical signal and transmit the electrical signal to the speaker 1261. The speaker 1261 converts the electrical signal into a voice signal for output. On the other hand, the microphone 1262 converts a collected voice signal into an electrical signal. The audio circuit 1260 receives the electrical signal, converts the electrical signal into audio data, and outputs the audio data to the processor 1280 for processing. Then, the processor transmits the audio data to, for example, another tablet computer by using the RF circuit 1210, or outputs the audio data to the memory 1220 for further processing.

Wi-Fi is a short distance wireless transmission technology. The tablet computer may help, by using the Wi-Fi module 1270, a user receive and transmit an email, browse a web page, access stream media, and the like. This provides wireless broadband Internet access for the user. Although FIG. 12 shows the Wi-Fi module 1270, it may be understood that the Wi-Fi module is not a necessary component of the tablet computer, and the Wi-Fi module may be omitted as required provided that the scope of the essence of the present disclosure is not changed. As can be appreciated, the Wi-Fi module may include circuitry to perform the functions thereof.

The processor 1280 is a control center of the tablet computer, and is connected to various parts of the entire tablet computer by using various interfaces and lines. By running or executing a software program and/or module stored in the memory 1220, and invoking data stored in the memory 1220, the processor 1280 executes various functions of the tablet computer and performs data processing, thereby monitoring the entire tablet computer. Optionally, the processor 1280 may include one or more processing units. Preferably, the processor 1280 may integrate circuitry such as an application processor and a modem. The application processor mainly processes an operating system, a user interface, an application, and the like. The modem mainly processes wireless communication. It may be understood that the modem may alternatively not be integrated into the processor 1280.

The tablet computer further includes the power supply 129X) (such as a battery) for supplying power to the components. Preferably, the power supply may be logically connected to the processor 1280 by using a power management system, thereby implementing functions such as charging, discharging, and power consumption management by using the power management system.

Although not shown in the figure, the tablet computer may further include a camera, a Bluetooth module, and the like, and details are not described herein again.

In an exemplary embodiment of this disclosure, the processor 1280 included in the terminal further controls and performs a procedure of a method performed by the terminal.

In an exemplary embodiment of this disclosure, the terminal includes a processor and a memory. The memory is configured to store computer-readable instructions, and the processor is configured to execute the computer-readable instructions in the memory to determine a target role in a visual layout region of a target interface, and display an event building block set in an event building block triggering region of the target interface. The processor may also add, in response to detecting a selection operation on a first event building block in the event building block set, the first event building block corresponding to the target role to a visual programming region of the target interface, and add, in response to detecting a selection operation on a first function building block in at least one function building block corresponding to the first event building block displayed in a function building block triggering region of the target interface, the first function building block corresponding to the target role to the visual programming region.

In a possible implementation, the first event building block includes a first begin block and a first end block. The first begin block and the first end block are arranged transversely or arranged longitudinally in the visual programming region.

In a possible implementation, the first begin block is associated with the first end block by using a first connector in a case that the first begin block and the first end block are arranged transversely in the visual programming region. The first begin block is associated with the first end block by using a second connector in a case that the first begin block and the first end block are arranged longitudinally in the visual programming region.

In a possible implementation, the first connector includes an omitting identifier used for indicating that the first event building block is capable of being unfolded.

In a possible implementation, the processor is configured to execute the computer-readable instructions in the memory, to perform the following steps. In a first step, a building block unfolding identifier associated with the first event building block is displayed in the visual programming region in a case that the first begin block and the first end block are arranged transversely in the visual programming region. In a second step, the first event building block is unfolded in response to detecting an unfolding instruction for the building block unfolding identifier, and, in the visual programming region, a first event region is displayed with the first event building block unfolded. In a third step, in response to detecting a selection operation on a first function building block in at least one function building block corresponding to the first event building block displayed in the function building block triggering region, the first function building block is determined. In a fourth step, the first function building block is added to the first event region in response to detecting a drag operation on the first function building block.

In a possible implementation, the processor is configured to execute the computer-readable instructions in the memory, to perform the following steps. In a first step, a building block folding identifier associated with the first event building block is displayed in the visual programming region in a case that the first begin block and the first end block are arranged longitudinally in the visual programming region. In a second step, the first function building block is unfolded in the first event region in response to detecting a folding instruction for the building block folding identifier.

In a possible implementation, the processor is configured to execute the computer-readable instructions in the memory, to add, in response to detecting a selection operation on a second event building block in the event building block set, the second event building block corresponding to the target role to the visual programming region of the target interface, the second event building block and the first event building block being arranged in a longitudinally aligned manner in the visual programming region.

In a possible implementation, the processor is configured to execute the computer-readable instructions in the memory, to add, in response to detecting a selection operation on a second function building block in the at least one function building block corresponding to the first event building block displayed in the function building block triggering region of the target interface, the second function building block corresponding to the target role to the visual programming region. The first function building block and the second function building block are displayed in combination or side by side in a first event region.

In a possible implementation, the first function building block is any one of a function building block of a logic type, a function building block of a basic building block type, a function building block of a fillable type, a function building block of a minimum building block unit type, and a function building block of an advanced function building block type.

In a possible implementation, the function building block of a logic type, the function building block of a basic building block type, the function building block of a fillable type, the function building block of a minimum building block unit type, and the function building block of an advanced function building block type are displayed in different colors.

In a possible implementation, the processor is configured to execute the computer-readable instructions in the memory, to control, in response to detecting a drag operation on the first event building block, the first event building block to move in the visual programming region, to adjust an order in which the first event building block and other event building blocks are arranged, and a position of the first event building block in the visual programming region.

In a possible implementation, the processor is configured to execute the computer-readable instructions in the memory, to display an operation option menu for the first event building block in the visual programming region in response to detecting an edition operation on the first event building block.

In a possible implementation, the processor is configured to execute the computer-readable instructions in the memory, to perform the following steps. In a first step, an event selection button corresponding to each event building block in the event building block set on the event building block triggering region is detected. In a second step, according to a selected event selection button, a selection operation on an event building block corresponding to the selected event selection button is performed. In a third step, preset touch position corresponding to each event building block in the event building block set on the event building block triggering region is detected, and in a fourth step, according to a touched preset touch position, a selection operation on an event building block corresponding to the touched preset touch position is performed.

In a possible implementation, in the event building block triggering region, a plurality of event building blocks in the event building block set are automatically sorted according to an application type to which the target role belongs, or automatically sorted according to frequencies of addition of the plurality of event building blocks, or automatically sorted according to a programming intention for the target role.

In a possible implementation, event building blocks arranged longitudinally are moved transversely in the visual programming region. In response to detecting that the event building blocks arranged longitudinally are released, the event building blocks moved transversely are automatically reset in the visual programming region. Function building blocks arranged longitudinally are moved transversely in the visual programming region. In response to detecting that the function building blocks arranged longitudinally are released, the function building blocks moved transversely are automatically reset in the visual programming region.

In a possible implementation, in the function building block triggering region, a plurality of function building blocks in the function building block set are automatically sorted according to an application type to which the target role belongs, or automatically sorted according to frequencies of addition of the plurality of function building blocks, or automatically sorted according to a programming intention for the target role.

In exemplary embodiments of this disclosure, the processor is configured to execute the computer-readable instructions in the memory, to perform the following steps. In a first step, a target interface is displayed. In a second step, in response to detecting a selection operation on a first event building block in an event building block set of the target interface, the first event building block corresponding to a target role is added to a visual programming region of the target interface. The event building block set is displayed in an event building block triggering region of the target interface, and the target role is displayed in a visual layout region of the target interface. In a third step, in response to detecting a selection operation on a first function building block in at least one function building block corresponding to the first event building block displayed in a function building block triggering region of the target interface, the first function building block corresponding to the target role is added to the visual programming region of the target interface.

Figure 13:
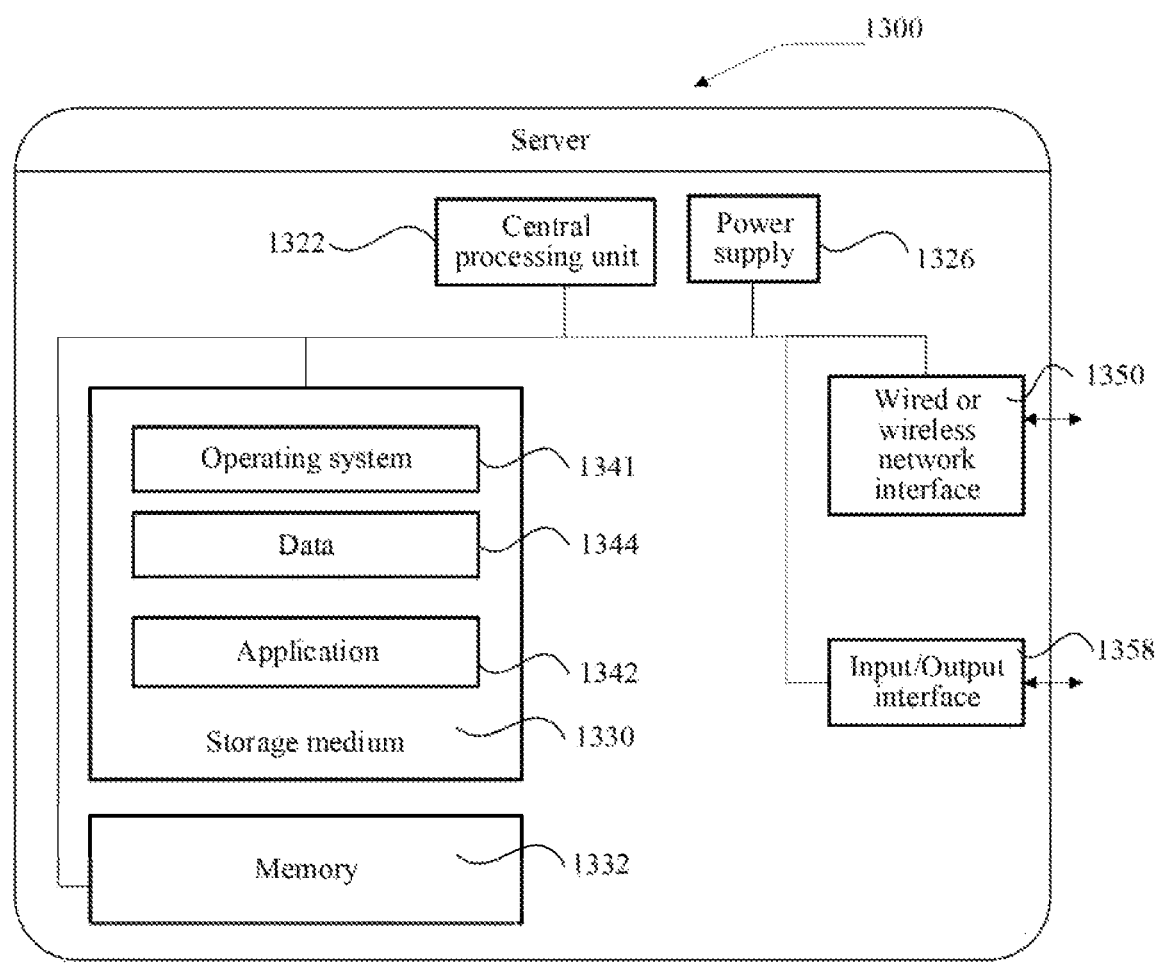
FIG. 13 is a schematic diagram of a composition structure of a server to which a method for performing visual programming is applicable according to an exemplary embodiment of this disclosure.

FIG. 13 is a schematic structural diagram of a server according to an exemplary embodiment of this disclosure. The server 1300 may vary greatly due to different configurations or performance, and may include one or more central processing units (CPU) 1322 (for example, one or more processors, i.e., processing circuitry) and a memory 1332, and one or more storage media 1330 (for example, one or more mass storage devices) that store applications 1342 or data 1344. The program stored in the storage medium 1330 may include one or more modules (not shown in the figure), and each module may include a series of instruction operations for the server. Further, the CPU 1322 may be set to communicate with the storage medium 1330, and perform, on the server 1300, the series of instruction operations in the storage medium 1330.

The server 1300 may further include one or more power supplies 1326, one or more wired or wireless network interfaces 1350, one or more input/output interfaces 1358, and/or one or more operating systems 1341 such as Windows Server™, Mac OS X™, Unix™, Linux™, or FreeBSD™.

The steps in the method for performing visual programming performed by the server in the foregoing exemplary embodiments may be based on the server structure shown in FIG. 13.

An exemplary embodiment of this disclosure further provides a non-transitory computer-readable storage medium, including instructions that when run on a computer, cause the computer to perform the following steps. In a first step, a target role in a visual layout region of a target interface is determined. In a second step, an event building block set is displayed in an event building block triggering region of the target interface. In a third step, in response to detecting a selection operation on a first event building block in the event building block set, the first event building block corresponding to the target role is added to a visual programming region of the target interface. In a fourth step, in response to detecting a selection operation on a first function building block in at least one function building block corresponding to the first event building block displayed in a function building block triggering region of the target interface, the first function building block corresponding to the target role is added to the visual programming region.

In a possible implementation, the first event building block includes a first begin block and a first end block. The first begin block and the first end block are arranged transversely or arranged longitudinally in the visual programming region.

In a possible implementation, the first begin block is associated with the first end block by using a first connector in a case that the first begin block and the first end block are arranged transversely in the visual programming region. The first begin block is associated with the first end block by using a second connector in a case that the first begin block and the first end block are arranged longitudinally in the visual programming region.

In a possible implementation, the first connector includes an omitting identifier used for indicating that the first event building block is capable of being unfolded.

In a possible implementation, when the instructions are run on a computer, the computer is caused to perform the following steps. In a first step, a building block unfolding identifier associated with the first event building block is displayed in the visual programming region in a case that the first begin block and the first end block are arranged transversely in the visual programming region. In a second step, the first event building block is unfolded in response to detecting an unfolding instruction for the building block unfolding identifier, and displaying, in the visual programming region, a first event region with the first event building block unfolded. In a third step, in response to detecting a selection operation on a first function building block in at least one function building block corresponding to the first event building block displayed in the function building block triggering region, the first function building block is determined. In a fourth step, the first function building block is added to the first event region in response to detecting a drag operation on the first function building block.

In a possible implementation, when the instructions are run on a computer, the computer is caused to perform the following steps. In a first step, a building block folding identifier associated with the first event building block is displayed in the visual programming region in a case that the first begin block and the first end block are arranged longitudinally in the visual programming region. In a second step, the first function building block in the first event region in response to detecting a folding instruction for the building block folding identifier.

In a possible implementation, when the instructions are run on a computer, the computer is caused to add, in response to detecting a selection operation on a second event building block in the event building block set, the second event building block corresponding to the target role to the visual programming region of the target interface. The second event building block and the first event building block are arranged in a longitudinally aligned manner in the visual programming region.

In a possible implementation, when the instructions are run on a computer, the computer is caused to add, in response to detecting a selection operation on a second function building block in the at least one function building block corresponding to the first event building block displayed in the function building block triggering region of the target interface, the second function building block corresponding to the target role to the visual programming region. The first function building block and the second function building block are displayed in combination or side by side in a first event region.

In a possible implementation, the first function building block is any one of a function building block of a logic type, a function building block of a basic building block type, a function building block of a fillable type, a function building block of a minimum building block unit type, and a function building block of an advanced function building block type.

In a possible implementation, the function building block of a logic type, the function building block of a basic building block type, the function building block of a fillable type, the function building block of a minimum building block unit type, and the function building block of an advanced function building block type are displayed in different colors.

In a possible implementation, when the instructions are run on a computer, the computer is caused to control, in response to detecting a drag operation on the first event building block, the first event building block to move in the visual programming region, to adjust an order in which the first event building block and other event building blocks are arranged, and a position of the first event building block in the visual programming region.

In a possible implementation, when the instructions are run on a computer, the computer is caused to display an operation option menu for the first event building block in the visual programming region in response to detecting an edition operation on the first event building block.

In a possible implementation, when the instructions are run on a computer, the computer is caused to perform the following steps. In a first step, an event selection button corresponding to each event building block in the event building block set on the event building block triggering region is detected, and, according to a selected event selection button, a selection operation on an event building block corresponding to the selected event selection button is performed. In a second step, a preset touch position corresponding to each event building block in the event building block set on the event building block triggering region is detected, and, according to a touched preset touch position, a selection operation on an event building block corresponding to the touched preset touch position is performed.

In a possible implementation, in the event building block triggering region, a plurality of event building blocks in the event building block set are automatically sorted according to an application type to which the target role belongs, or automatically sorted according to frequencies of addition of the plurality of event building blocks, or automatically soiled according to a programming intention for the target role.

In a possible implementation, event building blocks arranged longitudinally are moved transversely in the visual programming region, and in response to detecting that the event building blocks arranged longitudinally are released, the event building blocks moved transversely are automatically reset in the visual programming region. Function building blocks arranged longitudinally are moved transversely in the visual programming region, and in response to detecting that the function building blocks arranged longitudinally are released, the function building blocks moved transversely are automatically reset in the visual programming region.

In a possible implementation, in the function building block triggering region, a plurality of function building blocks in the function building block set are automatically sorted according to an application type to which the target role belongs, or automatically sorted according to frequencies of addition of the plurality of function building blocks, or automatically sorted according to a programming intention for the target role.

In some exemplary embodiments of this disclosure, when the instructions are run on a computer, the computer is caused to perform the following steps. In a first step, a target interface is displayed. In a second step, in response to detecting a selection operation on a first event building block in an event building block set of the target interface, the first event building block corresponding to a target role is added to a visual programming region of the target interface. The event building block set is displayed in an event building block triggering region of the target interface, and the target role is displayed in a visual layout region of the target interface. In a third step, in response to detecting a selection operation on a first function building block in at least one function building block corresponding to the first event building block displayed in a function building block triggering region of the target interface, the first function building block corresponding to the target role is added to the visual programming region of the target interface.

In addition, the exemplary apparatus embodiments described above are merely examples and other implementations are possible, as can be appreciated. Units described as separate parts may or may not be physically separate, and parts displayed as units may or may not be physical units, may be located in one position, or may be distributed on a plurality of network units. Some or all of the modules may be selected based on an actual requirement, to achieve the objectives of the solutions of the exemplary embodiments. In addition, in the accompanying drawings of the exemplary apparatus embodiments, connection relationships between modules indicate that the modules have communication connections with each other, which may be implemented as one or more communication buses or signal cables.

Based on the description of the foregoing implementations, a person skilled in the art may recognize that the exemplary embodiments of this disclosure may be implemented by software in addition to necessary hardware, or by dedicated hardware, including a dedicated integrated circuit, a dedicated CPU, a dedicated memory, a dedicated component, and the like. Generally, any functions that are performed by a computer program can be implemented by using corresponding hardware. Moreover, a hardware structure used to achieve the same function may be of various forms, for example, in a form of an analog circuit, a digital circuit, or a dedicated circuit. Moreover, implementations involving software include a computer software product that is stored in a non-transitory readable storage medium, such as a floppy disk, a USB flash drive, a removable hard disk, a read-only memory (ROM), a random access memory (RAM), a magnetic disk, or an optical disc of a computer, and may include several instructions for instructing a computer device (which may be a personal computer, a server, a network device, or the like) to perform the methods described in the exemplary embodiments of this disclosure.

The foregoing exemplary embodiments are merely intended for describing the technical solutions of this disclosure, and are not limiting. A person of ordinary skill in the art will recognize that modifications can be made to the technical solutions described in the foregoing exemplary embodiments or equivalent replacements may be made to some technical features thereof, without departing from the spirit and scope of the technical solutions of this disclosure.

What is claimed is:

1. A method for performing visual programming, applicable to a terminal, comprising:
    determining, with circuitry of the terminal, a target role in a visual layout region of a target interface;
    displaying, with the circuitry of the terminal, an event building block set in an event building block triggering region of the target interface;
    adding, in response to detecting a selection of a first event building block in the event building block set, the first event building block corresponding to the target role to a visual programming region of the target interface, the first event building block including a first begin block and a first end block, the first begin block and the first end block being arranged in the visual programming region based on a folding state of the first event building block;
    displaying a building block unfolding identifier associated with the first event building block in the visual programming region in a case that the first event block in the visual programming region is in a folded state;
    unfolding the first event building block in response to detecting an unfolding instruction for the building block unfolding identifier, and displaying, in the visual programming region, the first event building block in an unfolded state;
    displaying an indicator in the visual programming region in association with the first event building block, the indicator indicating a position in the visual programming region to which a first function building block of the first event building block is to be added;
    receiving a selection of the first function building block in at least one function building block corresponding to the first event building block displayed in a function building block triggering region of the target interface;
    determining, in response to detecting the selection of the first function building block in the at least one function building block corresponding to the first event building block displayed in the function building block triggering region, the first function building block;
    adding, in response to detecting the selection of the first function building block, the first function building block corresponding to the target role to the visual programming region based on the position of the indicator;
    displaying a building block folding identifier associated with the first event building block in the visual programming region in a case that the first event building block in the visual programming region is in the unfolded state; and
    hiding the first function building block in a first event region in response to detecting a folding instruction for the building block folding identifier, wherein
    the first begin block and the first end block are arranged transversely in the visual programming region in the case that the first event building block is in the folded state,
    the first begin block and the first end block are arranged longitudinally in the visual programming region in the case that the first event building block is in the unfolded state, and
    the first function building block is added to the visual programming region in response to detecting a drag operation on the first function building block.

2. The method according to claim 1, wherein
    the first begin block is associated with the first end block by using a first connector in the case that the first begin block and the first end block are arranged transversely in the visual programming region; and
    the first begin block is associated with the first end block by using a second connector in the case that the first begin block and the first end block are arranged longitudinally in the visual programming region.

3. The method according to claim 2, wherein the first connector comprises:
    an omitting identifier used for indicating that the first event building block is capable of being unfolded.

4. The method according to claim 1, wherein after the adding of the first event building block corresponding to the target role to the visual programming region of the target interface, the method further comprises:
    adding, in response to detecting a selection of a second event building block in the event building block set, the second event building block corresponding to the target role to the visual programming region of the target interface, the second event building block and the first event building block being arranged in a longitudinally aligned manner in the visual programming region.

5. The method according to claim 1, wherein after the adding the first function building block corresponding to the target role to the visual programming region, the method further comprises:
    adding, in response to detecting the selection of a second function building block in the at least one function building block corresponding to the first event building block displayed in the function building block triggering region of the target interface, the second function building block corresponding to the target role to the visual programming region, the first function building block and the second function building block being displayed in combination or side by side in the first event region.

6. The method according to claim 1, wherein the first function building block is any one of a function building block of a logic type, a function building block of a basic building block type, a function building block of a fillable type, a function building block of a minimum building block unit type, and a function building block of an advanced function building block type.

7. The method according to claim 6, wherein the function building block of a logic type, the function building block of a basic building block type, the function building block of a fillable type, the function building block of a minimum building block unit type, and the function building block of an advanced function building block type are displayed in different colors.

8. The method according to claim 1, wherein after the adding the first event building block corresponding to the target role to the visual programming region of the target interface, the method further comprises:
controlling, in response to detecting the drag operation on the first event building block, the first event building block to move in the visual programming region, to adjust an order in which the first event building block and other event building blocks are arranged, and a position of the first event building block in the visual programming region.

9. The method according to claim 1, wherein after the adding the first event building block corresponding to the target role to the visual programming region of the target interface, the method further comprises:
displaying an operation option menu for the first event building block in the visual programming region in response to detecting an edit operation on the first event building block.

10. The method according to claim 1, wherein the detecting the selection of the first event building block in the event building block set comprises:
detecting an event selection button corresponding to each event building block in the event building block set on the event building block triggering region, and responding, according to a selected event selection button, with a selection operation on the first event building block corresponding to the selected event selection button; or detecting a preset touch position corresponding to each event building block in the event building block set on the event building block triggering region, and responding, according to a touched preset touch position, with a selection operation on the first event building block corresponding to the touched preset touch position.

11. The method according to claim 1, wherein in the event building block triggering region, a plurality of event building blocks in the event building block set are automatically sorted according to an application type to which the target role belongs, or automatically sorted according to frequencies of addition of the plurality of event building blocks, or automatically sorted according to a programming intention for the target role.

12. The method according to claim 1, wherein
event building blocks arranged longitudinally are moved transversely in the visual programming region; and in response to detecting that the event building blocks arranged longitudinally are released, the event building blocks moved transversely are automatically reset in the visual programming region; or function building blocks arranged longitudinally are moved transversely in the visual programming region; and in response to detecting that the function building blocks arranged longitudinally are released, the function building blocks moved transversely are automatically reset in the visual programming region.

13. The method according to claim 1, wherein in the function building block triggering region, a plurality of function building blocks in the function building block set are automatically sorted according to an application type to which the target role belongs, or automatically sorted according to frequencies of addition of the plurality of function building blocks, or automatically sorted according to a programming intention for the target role.

14. An apparatus for performing visual programming, comprising:
processing circuitry configured to
determine a target role in a visual layout region of a target interface;
cause a display to display an event building block set in an event building block triggering region of the target interface;
add, in response to detecting a selection of a first event building block in the event building block set, the first event building block corresponding to the target role to a visual programming region of the target interface, the first event building block including a first begin block and a first end block, the first begin block and the first end block being arranged in the visual programming region based on a folding state of the first event building block;
display a building block unfolding identifier associated with the first event building block in the visual programming region in a case that the first event block in the visual programming region is in a folded state;
unfold the first event building block in response to detecting an unfolding instruction for the building block unfolding identifier, and displaying, in the visual programming region, the first event building block in an unfolded state;
display an indicator in the visual programming region in association with the first event building block, the indicator indicating a position in the visual programming region to which a first function building block of the first event building block is to be added;
receive a selection of the first function building block in at least one function building block corresponding to the first event building block displayed in a function building block triggering region of the target interface;
determine, in response to detecting the selection of the first function building block in the at least one function building block corresponding to the first event building block displayed in the function building block triggering region, the first function building block;
add, in response to detecting the selection of the first function building block, the first function building block corresponding to the target role to the visual programming region based on the position of the indicator;
display a building block folding identifier associated with the first event building block in the visual programming region in a case that the first event building block in the visual programming region is in the unfolded state; and hide the first function building block in a first event region in response to detecting a folding instruction for the building block folding identifier, wherein the first begin block and the first end block are arranged transversely in the visual programming region in the case that the first event building block is in the folded state, the first begin block and the first end block are arranged longitudinally in the visual programming region in the case that the first event building block is in the unfolded state, and the first function building block is added to the visual programming region in response to detecting a drag operation on the first function building block.

15. An apparatus for performing visual programming, comprising:

processing circuitry configured to cause a display to display a target interface;

add, in response to detecting a selection of a first event building block in an event building block set of the target interface, the first event building block corresponding to a target role to a visual programming region of the target interface, the event building block set being displayed in an event building block triggering region of the target interface, and the target role being displayed in a visual layout region of the target interface, the first event building block including a first begin block and a first end block, the first begin block and the first end block being arranged in the visual programming region based on a folding state of the first event building block;

display a building block unfolding identifier associated with the first event building block in the visual programming region in a case that the first event block in the visual programming region is in a folded state;

unfold the first event building block in response to detecting an unfolding instruction for the building block unfolding identifier, and displaying, in the visual programming region, the first event building block in an unfolded state;

display an indicator in the visual programming region in association with the first event building block, the indicator indicating a position in the visual programming region to which a first function building block of the first event building block is to be added;

receive a selection of the first function building block in at least one function building block corresponding to the first event building block displayed in a function building block triggering region of the target interface;

determine, in response to detecting the selection of the first function building block in the at least one function building block corresponding to the first event building block displayed in the function building block triggering region, the first function building block;

add, in response to detecting the selection of the first function building block, the first function building block corresponding to the target role to the visual programming region of the target interface based on the position of the indicator;

display a building block folding identifier associated with the first event building block in the visual programming region in a case that the first event building block in the visual programming region is in the unfolded state; and hide the first function building block in a first event region in response to detecting a folding instruction for the building block folding identifier, wherein the first begin block and the first end block are arranged transversely in the visual programming region in the case that the first event building block is in the folded state, the first begin block and the first end block are arranged longitudinally in the visual programming region in the case that the first event building block is in the unfolded state, and the first function building block is added to the visual programming region in response to detecting a drag operation on the first function building block.

16. A non-transitory computer-readable storage medium including computer-readable instructions that, when executed by processing circuitry, cause the processing circuitry to perform the method according to claim 1.

* * * * *